(12) United States Patent
Kobayashi et al.

(10) Patent No.: US 12,207,070 B2
(45) Date of Patent: Jan. 21, 2025

(54) SOUND OUTPUT CONTROL DEVICE, SOUND OUTPUT SYSTEM, SOUND OUTPUT CONTROL METHOD, AND COMPUTER-READABLE STORAGE MEDIUM

(71) Applicant: JVCKENWOOD Corporation, Yokohama (JP)

(72) Inventors: Tatsuru Kobayashi, Yokohama (JP); Toshikazu Fujii, Yokohama (JP); Kazuo Nomura, Yokohama (JP); Tatsuhiro Sukegawa, Yokohama (JP); Shinji Kamimura, Yokohama (JP); Jeong-ju Choe, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 287 days.

(21) Appl. No.: 17/946,162

(22) Filed: Sep. 16, 2022

(65) Prior Publication Data
US 2023/0012555 A1     Jan. 19, 2023

Related U.S. Application Data

(63) Continuation of application No. PCT/JP2020/043489, filed on Nov. 20, 2020.

(30) Foreign Application Priority Data

Mar. 25, 2020 (JP) .................. 2020-054196
Mar. 25, 2020 (JP) .................. 2020-054197
Mar. 25, 2020 (JP) .................. 2020-054853

(51) Int. Cl.
*H04R 5/04* (2006.01)
*H04R 3/04* (2006.01)
*H04R 5/033* (2006.01)

(52) U.S. Cl.
CPC .............. *H04R 5/04* (2013.01); *H04R 3/04* (2013.01); *H04R 5/033* (2013.01)

(58) Field of Classification Search
CPC . H04R 5/04; H04R 3/04; H04R 5/033; H04R 2420/07; H04R 1/1083;
(Continued)

(56) References Cited

U.S. PATENT DOCUMENTS 8,913,753 B2 * 12/2014 Cohen .................. H04S 1/00
                                                            381/74
2014/0270200 A1 * 9/2014 Usher .................. G10L 25/78
                                                            381/74
(Continued)

FOREIGN PATENT DOCUMENTS

JP     2011-203654    10/2011
JP     2016-192211    11/2016
(Continued)

OTHER PUBLICATIONS

International Search Report and Written Opinion for International Application No. PCT/JP2020/043489 mailed on Feb. 2, 2021, 7 pages.

*Primary Examiner* — Xu Mei
(74) *Attorney, Agent, or Firm* — Amin, Turocy & Watson, LLP

(57) ABSTRACT

A sound output control device includes: an orientation detecting unit configured to detect a state of orientation of a face of a user; an ambient sound obtaining unit configured to obtain ambient sound; an ambient sound reducing processing unit configured to perform, based on the ambient sound, processing of reducing the ambient sound; and a sound output control unit configured to cause sound to be output with the ambient sound reduced by the ambient sound reducing processing unit, when the detected orientation of the face of the user is in a first state, and make audibility of (Continued)

the ambient sound higher than in a state where the ambient sound has been reduced by the ambient sound reducing processing unit, when the detected orientation of the face of the user is in a second state changed from the first state.

16 Claims, 22 Drawing Sheets

(58) Field of Classification Search
CPC ...... H04R 29/00–008; H04R 2227/001; G06F 3/01; G06F 3/16; G10K 11/178; G10L 21/0208; H04S 7/304
USPC ........................................ 381/57, 74, 86, 123
See application file for complete search history.

(56) References Cited

U.S. PATENT DOCUMENTS

| | | | |
|---|---|---|---|
| 2021/0294414 A1 | 9/2021 | Nomura et al. | |
| 2022/0070585 A1* | 3/2022 | Chen .................... | H04R 1/1041 |
| 2022/0408178 A1* | 12/2022 | Choi .................... | H04R 1/1016 |
| 2023/0228585 A1* | 7/2023 | Malta .................... | G01C 21/28 |
| | | | 381/309 |

FOREIGN PATENT DOCUMENTS

| | | |
|---|---|---|
| WO | 2012/165657 | 12/2012 |
| WO | 2020/031767 | 2/2020 |
| WO | 2020/045328 | 3/2020 |

\* cited by examiner

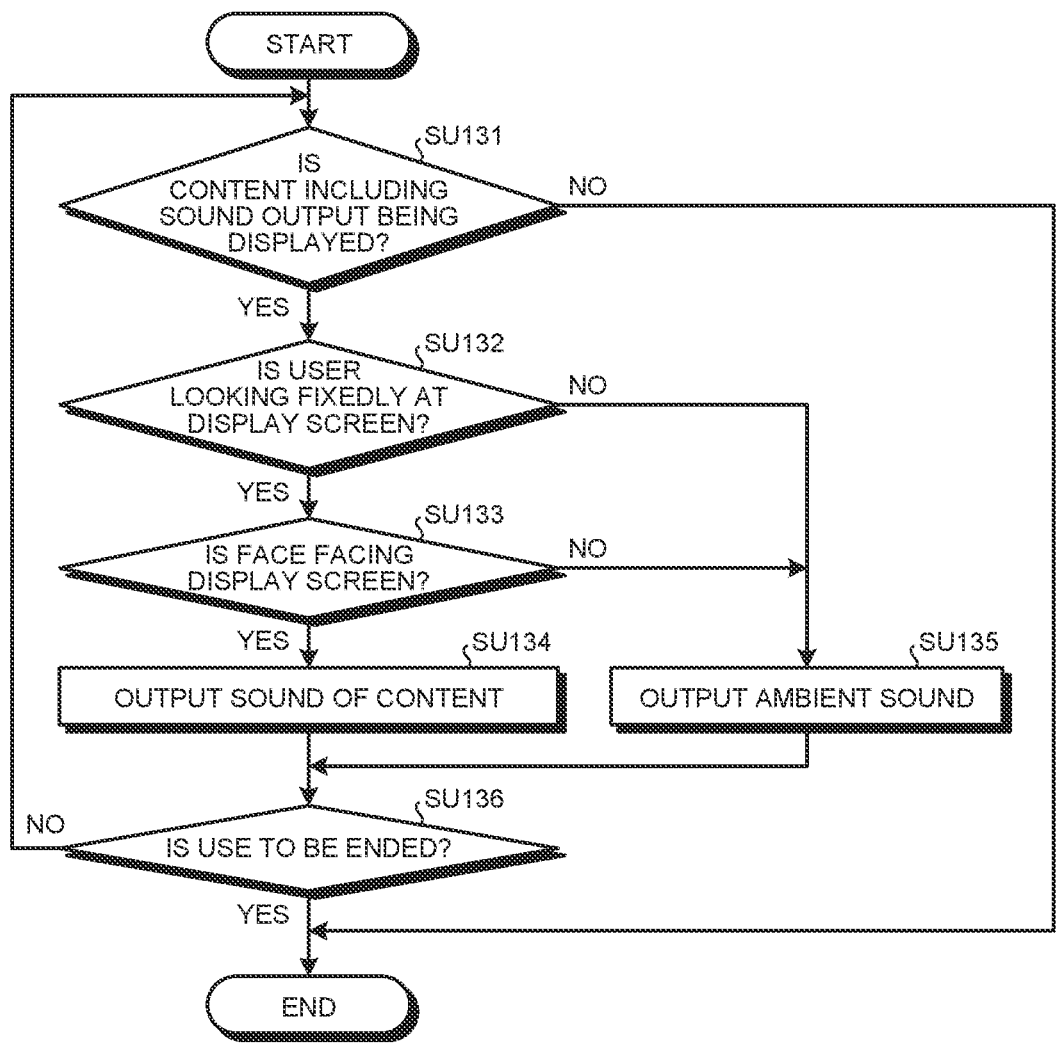

SOUND OUTPUT CONTROL DEVICE, SOUND OUTPUT SYSTEM, SOUND OUTPUT CONTROL METHOD, AND COMPUTER-READABLE STORAGE MEDIUM

CROSS-REFERENCE TO RELATED APPLICATION

This application is a Continuation of PCT International Application No. PCT/JP2020/043489 filed on Nov. 20, 2020 which claims the benefit of priority from Japanese Patent Application Nos. 2020-054196, 2020-054197, and 2020-054853, each filed on Mar. 25, 2020, the entire contents of all of which are incorporated herein by reference.

BACKGROUND

The present disclosure relates to sound output control devices, sound output systems, sound output control methods, and computer-readable storage mediums.

Known technologies for displaying content on display screens and additionally outputting sound includes technologies related to devices for electronic books and games having sound outputting capability (see, for example, Japanese Unexamined Patent Application Publication No. 2016-192211).

However, when such a device is being used by a user when the user is on public transport, for example, ambient sound, such as announcements within a train, may be difficult to be heard by the user.

SUMMARY

A sound output control device according to an embodiment includes: an orientation detecting unit configured to detect a state of orientation of a face of a user with a sensor included in headphones worn by the user; an ambient sound obtaining unit configured to obtain ambient sound around the user from a microphone included in the headphones; an ambient sound reducing processing unit configured to perform, based on the ambient sound obtained by the ambient sound obtaining unit, processing of reducing the ambient sound for sound output of the headphones; a determining unit configured to determine whether the user is using a means of transportation; and when the determining unit determines that the user is using the means of transportation, a sound output control unit configured to, when the state of the orientation of the face of the user detected by the orientation detecting unit is in a first state, cause sound to be output with the ambient sound reduced by the ambient sound reducing processing unit, and when the state of the orientation of the face of the user detected by the orientation detecting unit is in a second state changed from the first state, make audibility of the ambient sound higher than in a state where the ambient sound has been reduced by the ambient sound reducing processing unit.

A sound output control device according to an embodiment includes: a line-of-sight detecting unit configured to detect a direction of a line of sight of a user with a line-of-sight sensor arranged to be directed in a same direction as a display screen; an ambient sound obtaining unit configured to obtain ambient sound around the user from a microphone included in headphones worn by the user; a fixed look determining unit configured to determine, based on a result of detection by the line-of-sight detecting unit, whether the user is looking fixedly at the display screen displaying content; a determining unit configured to determine whether the user is using a means of transportation; and when the determining unit determines that the user is using the means of transportation, a sound output control unit configured to, when the fixed look determining unit determines that the user is not looking fixedly at the display screen displaying content, make audibility of the ambient sound higher than when the fixed look determining unit determines that the user is looking fixedly at the display screen displaying content.

A sound output system according to an embodiment includes: any one of the sound output control devices described above; a sound pickup unit configured to pick up ambient sound; and a sound output unit configured to output sound.

A sound output control method according to an embodiment is executed by a sound output control device, and includes: detecting a state of orientation of a face of a user with a sensor included in headphones worn by the user; obtaining ambient sound around the user from a microphone included in the headphones; determining whether the user is using a means of transportation; and when the user is using the means of transportation, outputting, when the state of the orientation of the face of the user is in a first state, sound with ambient sound that has been reduced for sound output of the headphones based on the ambient sound obtained, and making, when the state of the orientation of the face of the user is in a second state changed from the first state, audibility of ambient sound higher than in a state where the ambient sound has been reduced.

A non-transitory computer-readable storage medium according to an embodiment stores a computer program causing a computer to execute: detecting a state of orientation of a face of a user with a sensor included in headphones worn by the user; obtaining ambient sound around the user from a microphone included in the headphones; determining whether the user is using a means of transportation; and when the user is using the means of transportation, outputting, when the state of the orientation of the face of the user is in a first state, sound with ambient sound that has been reduced for sound output of the headphones based on the ambient sound obtained, and making, when the state of the orientation of the face of the user is in a second state changed from the first state, audibility of ambient sound higher than in a state where the ambient sound has been reduced.

A sound output control method according to an embodiment includes: detecting a direction of a line of sight of a user who is using headphones, with a line-of-sight sensor arranged to be directed in a same direction as a display screen; obtaining ambient sound around the user from a microphone included in the headphones; determining, based on a result of detection of the direction of the line of sight, whether the user is looking fixedly at a display screen displaying content; determining whether the user is using a means of transportation; and when the user is using the means of transportation, making, when the user is not looking fixedly at the display screen displaying content, audibility of the ambient sound higher than when the user is looking fixedly at the display screen displaying content.

A non-transitory computer-readable storage medium according to an embodiment stores a computer program causing a computer to execute: detecting a direction of a line of sight of a user who is using headphones, with a line-of-sight sensor arranged to be directed in a same direction as a display screen; obtaining ambient sound around the user from a microphone included in the headphones; determining, based on a result of detection of the direction of the line of sight, whether the user is looking fixedly at a display screen displaying content; determining whether the user is using a means of transportation; and when the user is using the means of transportation, making, when the user is not looking fixedly at the display screen displaying content, audibility of the ambient sound higher than when the user is looking fixedly at the display screen displaying content.

BRIEF DESCRIPTION OF THE DRAWINGS

FIG. 23 is a flowchart illustrating an example of a flow of processing in the content output system according to the ninth embodiment.

DETAILED DESCRIPTION

Embodiments of a sound output system according to the present disclosure will hereinafter be described in detail by reference to the appended drawings. The present disclosure is not limited by the following embodiments.

First Embodiment

Sound Output System

Figure 1:
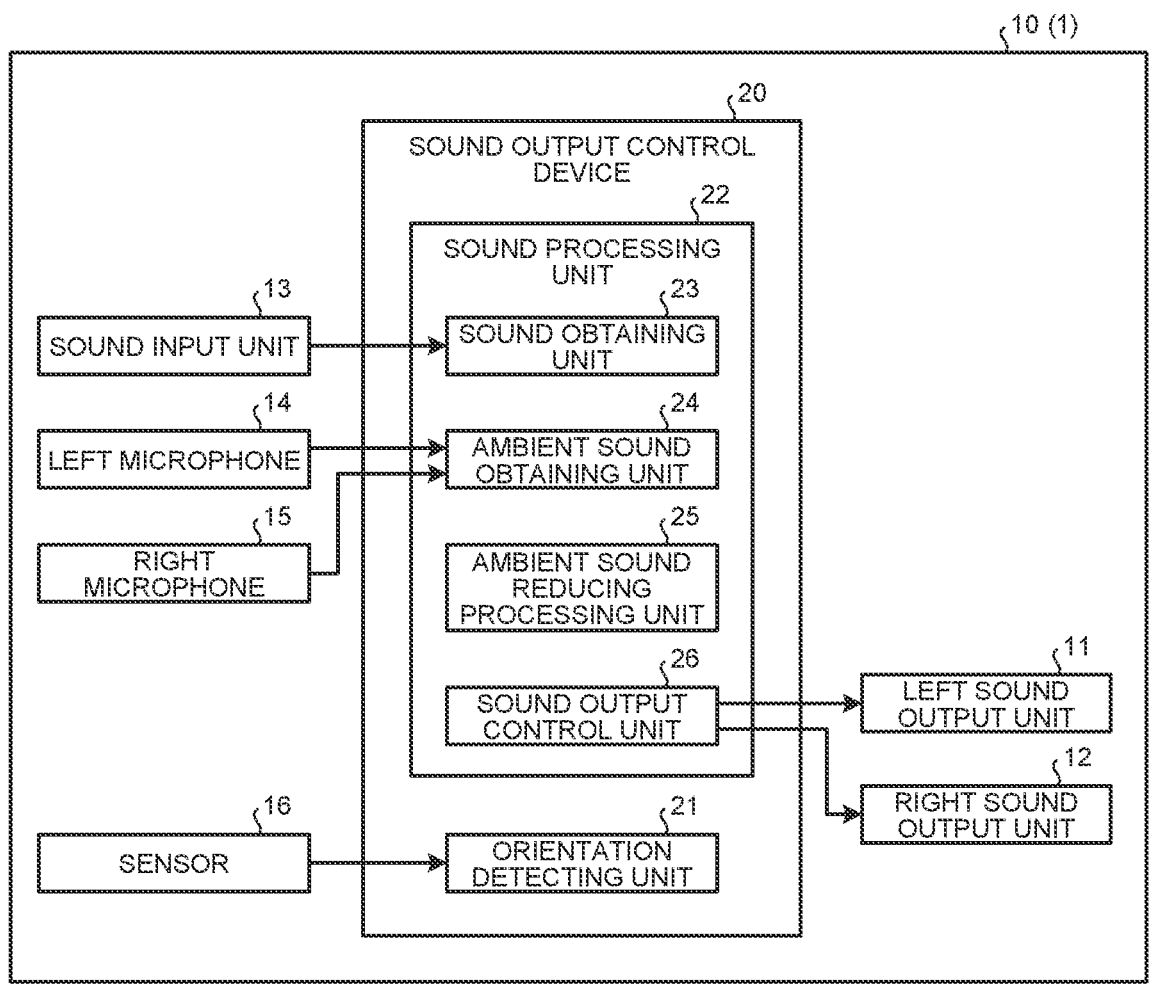
FIG. 1 is a block diagram illustrating a sound output device that is a sound output system according to a first embodiment.

FIG. 1 is a block diagram illustrating a sound output device 10 that is a sound output system 1 according to a first embodiment. The sound output device 10 is, for example, headphones 10. In this embodiment, the sound output system 1 is formed of the headphones 10 alone.

Headphones

The headphones 10 output sound and cancel noise from ambient sound. The headphones 10 are, for example, over-the-head headphones and worn over the head of a user. On the basis of sound data output from a sound output control device 20, the headphones 10 output sound. On the basis of a control signal output from the sound output control device 20, the headphones 10 are able to cancel ambient noise. The headphones 10 have the sound output control device 20 built therein. The headphones 10 include a left sound output unit 11, a right sound output unit 12, a sound input unit 13, a left microphone 14, a right microphone 15, a sensor 16, and the sound output control device 20.

The left sound output unit 11 is a sound output unit for the left ear. The left sound output unit 11 has a body that covers the left ear. The left sound output unit 11 outputs sound to be listened to through the left ear. The left sound output unit 11 obtains sound data from the sound output control device 20. The left sound output unit 11 outputs left channel data of the sound data. The left sound output unit 11 converts an electric signal obtained by D/A conversion of the left channel data of the sound data, into sound, and outputs the sound.

The right sound output unit 12 is a sound output unit for the right ear. The right sound output unit 12 outputs sound to be listened to through the right ear. The right sound output unit 12 obtains sound data from the sound output control device 20. The right sound output unit 12 outputs right channel data of the sound data. The right sound output unit 12 converts an electric signal obtained by D/A conversion of the right channel data of the sound data, into sound, and outputs the sound.

Sound data for content, such as, for example, music or a video, is input to the sound input unit 13. Sound data stored in, for example, a storage unit not illustrated in the drawings may be input to the sound input unit 13. Sound data may be input by wire or wirelessly to the sound input unit 13 from an electronic device, such as, for example, an electronic book device, a smartphone, a tablet terminal, a portable music playback device, or a portable game console, not illustrated in the drawings.

The left microphone 14 is arranged in the body of the left sound output unit 11. The left microphone 14 obtains ambient sound. The ambient sound is, for example, environmental sound including, for example, talking voice of someone and noise made by a vehicle. The left microphone 14 outputs the sound obtained, to an ambient sound obtaining unit 24.

The right microphone 15 is arranged in a body of the right sound output unit 12. The right microphone 15 obtains ambient sound. The right microphone 15 outputs the sound obtained, to the ambient sound obtaining unit 24.

A sensor 16 detects posture of the headphones 10, that is, orientation of the headphones 10. In other words, the sensor 16 detects orientation of the face of the user wearing the headphones 10. The sensor 16 detects the posture of the headphones 10 by using any of various sensors including, for example, a triaxial accelerometer. Any of publicly known methods may be used as a method of calculating a posture using any of the various sensors. The sensor 16 outputs a result detected, to an orientation detecting unit 21. The sensor 16 is preferably arranged in each of the body of the left sound output unit 11 and the body of the right sound output unit 12. Posture of the headphones 10 is thereby able to be detected highly accurately.

Sound Output Control Device

The sound output control device 20 causes sound to be output from the headphones 10 and ambient noise to be canceled. According to an orientation of the face of the user, the sound output control device 20 outputs sound with ambient sound that has been reduced, or makes audibility of ambient sound higher than that in a state where ambient sound has been reduced. The sound output control device 20 is an arithmetic processing device (a control unit) including, for example, a central processing unit (CPU) or a processor for sound processing. The sound output control device 20 loads a program that has been stored in a storage unit not illustrated in the drawings, into a memory, and executes commands included in the program. The sound output control device 20 includes the orientation detecting unit 21, a sound processing unit 22, and a storage unit that is an internal memory. The sound processing unit 22 includes a sound obtaining unit 23, the ambient sound obtaining unit 24, an ambient sound reducing processing unit 25, and a sound output control unit 26. The sound output control device 20 may be formed of one or more devices.

The orientation detecting unit 21 detects posture of the headphones 10, that is, orientation of the headphones 10, from a result of detection by the sensor 16. The orientation detecting unit 21 thereby detects orientation of the face of the user wearing the headphones 10. More particularly, the orientation detecting unit 21 detects that the orientation of the face of the user is in a first state or that the orientation of the face of the user is in a second state different from the first state. The orientation detecting unit 21 detects, for example, that the face of the user is being directed downward or that the face of the user is not being directed downward. The orientation detecting unit 21 is capable of detecting, for example, that acceleration caused by change in the orientation of the face of the user is lower than a threshold or that acceleration caused by change in the orientation of the face of the user is equal to or higher than the threshold.

In a case where the orientation of the face of the user has changed from the first state to the second state, it is likely that the user has directed the user's attention to the surrounds, by, for example, looking around the surrounds. In a case where the face of the user has changed from the state of being directed downward to the state of not being directed downward, it is likely that the user has directed the user's attention to the surrounds, by, for example, looking up to check the surrounds. The acceleration being equal to or higher than the threshold indicates that the orientation of the face of the user has changed rapidly, and in this case, it is likely that the user has directed the user's attention to the surrounds, the acceleration being caused by change in the orientation of the face of the user. As described above, in the case where the attention of the user has likely been directed to the surrounds, the noise canceling function of reducing ambient sound is preferably turned off for higher audibility of the ambient sound.

Figure 2:
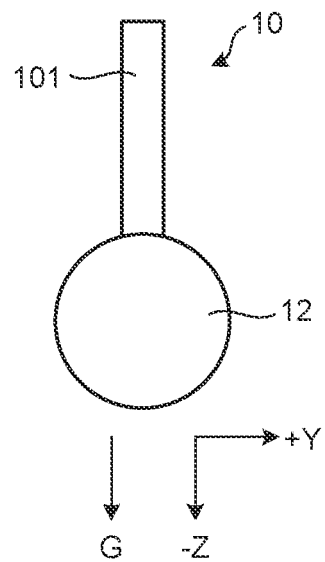
FIG. 2 is a schematic diagram illustrating an orientation of the sound output device.
Figure 3:
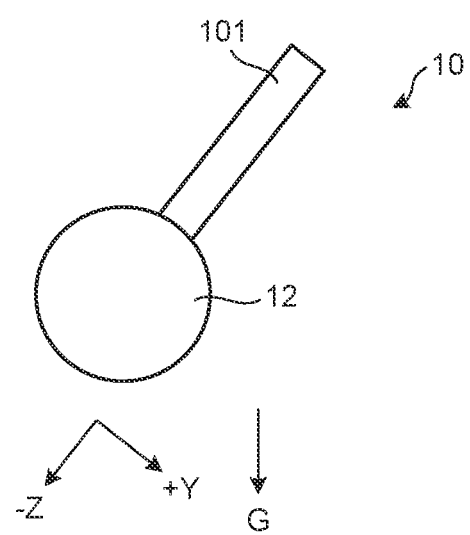
FIG. 3 is a schematic diagram illustrating another orientation of the sound output device.

FIG. 2 and FIG. 3 are schematic diagrams illustrating orientations of the headphones 10 in a case where the user is wearing the headphones 10 having a headband 101 placed over the top of the head of the user. FIG. 2 is a diagram illustrating a posture of the headphones 10 in a case where the headphones 10 are viewed in a lateral direction, specifically from a right side where the right sound output unit 12 is, in a state where the headphones 10 are being worn by the user. In this case, the face of the user wearing the headphones 10 is directed in the positive Y direction, forward and not downward. FIG. 3 is a diagram illustrating a posture of the headphones 10 in a case where the headphones 10 are viewed in the lateral direction, specifically from the right side in the state where the headphones 10 are being worn by the user, similarly to FIG. 2. In this case, the face of the user wearing the headphones 10 is directed downward in the positive Y direction.

As illustrated in FIG. 2 and FIG. 3, an orientation of the face of the user wearing the headphones 10 is prescribed by an inclination of the Y axis or Z axis of the headphones 10 to the direction of the gravitational acceleration G detected. When the user wearing the headphones 10 moves from a state where the user is facing straight ahead to a state where the user is facing downward, the posture of the headphones 10 changes from the state illustrated in FIG. 2 to the state illustrated in FIG. 3.

For example, in a state where the headphones 10 are being worn over the head of the user, whether or not the face of the user is directed downward is determined from the angle of the headphones 10. For example, if the direction of the gravitational acceleration G detected is within ±20 degrees from the negative Z direction like in the state illustrated in FIG. 2, it is determined that the face of the user is not directed downward and is directed forward. If the direction of the gravitational acceleration G detected is not within ±20 degrees from the negative Z direction like in the state illustrated in FIG. 3, it is determined that the face of the user is directed downward. Without being limited to the Z axis, the Y axis or a composite vector of the Z axis and Y axis may be used, for example.

Whether or not the headphones 10 are being worn over the head of the user is able to be determined by a result of detection by the sensor 16. In a case where a result of detection by the sensor 16 indicates that the X-axis direction is horizontal and the gravitational acceleration G is not detected within, for example, ±10 degrees from the positive Y axis direction or the negative Y axis direction, it is determined that the headphones 10 are being worn over the head of the user. In addition, another sensor may be used to detect, for example, how much the headband 101 is open or pressure on the ear pads.

The sound obtaining unit 23 obtains, from the sound input unit 13, sound data to be output from the left sound output unit 11 and the right sound output unit 12.

The ambient sound obtaining unit 24 obtains ambient sound around the user from the left microphone 14 and the right microphone 15.

On the basis of the ambient sound obtained by the ambient sound obtaining unit 24, the ambient sound reducing processing unit 25 reduces the ambient sound by performing noise canceling for the ambient sound. Any publicly known method is applicable as a method for the noise canceling. A signal resulting from inversion of the phase of the ambient sound is combined with the sound data obtained by the sound input unit 13 and the sound data combined with the signal is caused to be output by the sound output control unit 26.

The sound output control unit 26 performs control for output of sound data as sound from the headphones 10. More particularly, the sound output control unit 26 causes a signal to be output from the left sound output unit 11, the signal resulting from D/A conversion of left channel data of the sound data and amplification of the converted left channel data. The sound output control unit 26 causes a signal to be output from the right sound output unit 12, the signal resulting from D/A conversion of right channel data of the sound data and amplification of the converted right channel data.

In a case where the orientation of the face of the user is detected by the orientation detecting unit 21 to be in the first state, the sound output control unit 26 outputs sound with ambient sound that has been reduced by the ambient sound reducing processing unit 25, and in a case where the orientation of the face of the user has changed from the first state to the second state, the sound output control unit 26 makes audibility of ambient sound higher than that in a state where ambient sound has been reduced by the ambient sound reducing processing unit 25.

In a case where the face of the user is being directed downward, the sound output control unit 26 outputs sound with ambient sound that has been reduced by the ambient sound reducing processing unit 25, and in a case where the face of the user has changed from the state of being directed downward to the state of not being directed downward, the sound output control unit 26 makes audibility of ambient sound higher than that in a state where ambient sound has been reduced by the ambient sound reducing processing unit 25.

In a case where acceleration caused by change in the orientation of the face of the user is lower than the threshold, the sound output control unit 26 outputs sound with ambient sound that has been reduced by the ambient sound reducing processing unit 25, and in a case where acceleration caused by change in the orientation of the face of the user has become equal to or higher than the threshold, the sound output control unit 26 makes audibility of ambient sound higher than that in a state where ambient sound has been reduced by the ambient sound reducing processing unit 25.

To make audibility of ambient sound higher than that in a state where ambient sound has been reduced by the ambient sound reducing processing unit 25, the sound output control unit 26 may omit the ambient sound reducing processing by the ambient sound reducing processing unit 25. In this case, the sound output control unit 26 turns the noise canceling function off. It thereby becomes easier for the user wearing the headphones 10 to hear the ambient sound.

To make audibility of ambient sound higher than that in a state where ambient sound has been reduced by the ambient sound reducing processing unit 25, the sound output control unit 26 may omit the ambient sound reducing processing by the ambient sound reducing processing unit 25 and cause ambient sound obtained by the ambient sound obtaining unit 24, to be output from the left sound output unit 11 and the right sound output unit 12. The user wearing the headphones 10 is thereby able to hear the ambient sound from the left sound output unit 11 and the right sound output unit 12.

Figure 4:
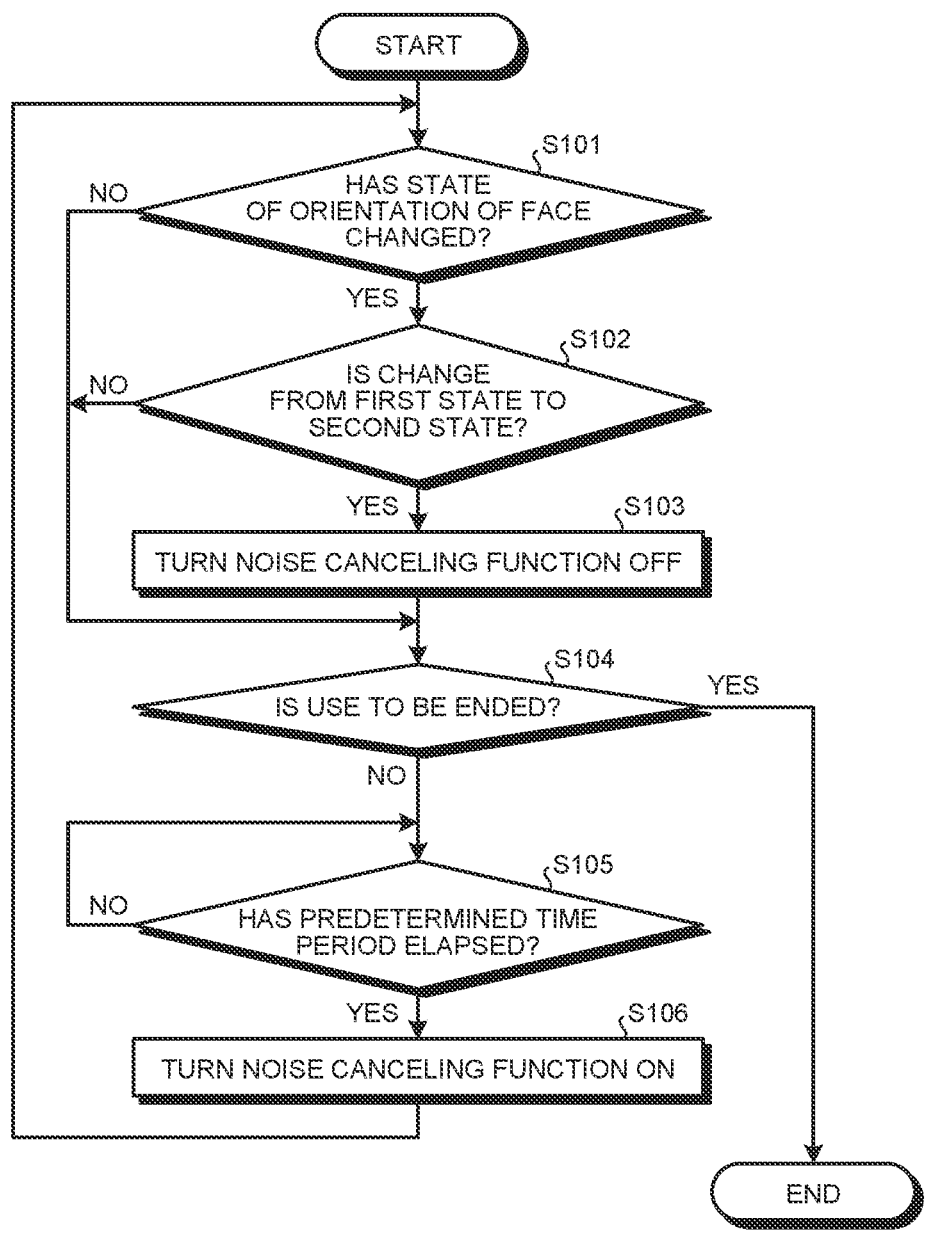
FIG. 4 is a flowchart illustrating an example of a flow of processing in the sound output system according to the first embodiment.
Figure 5:
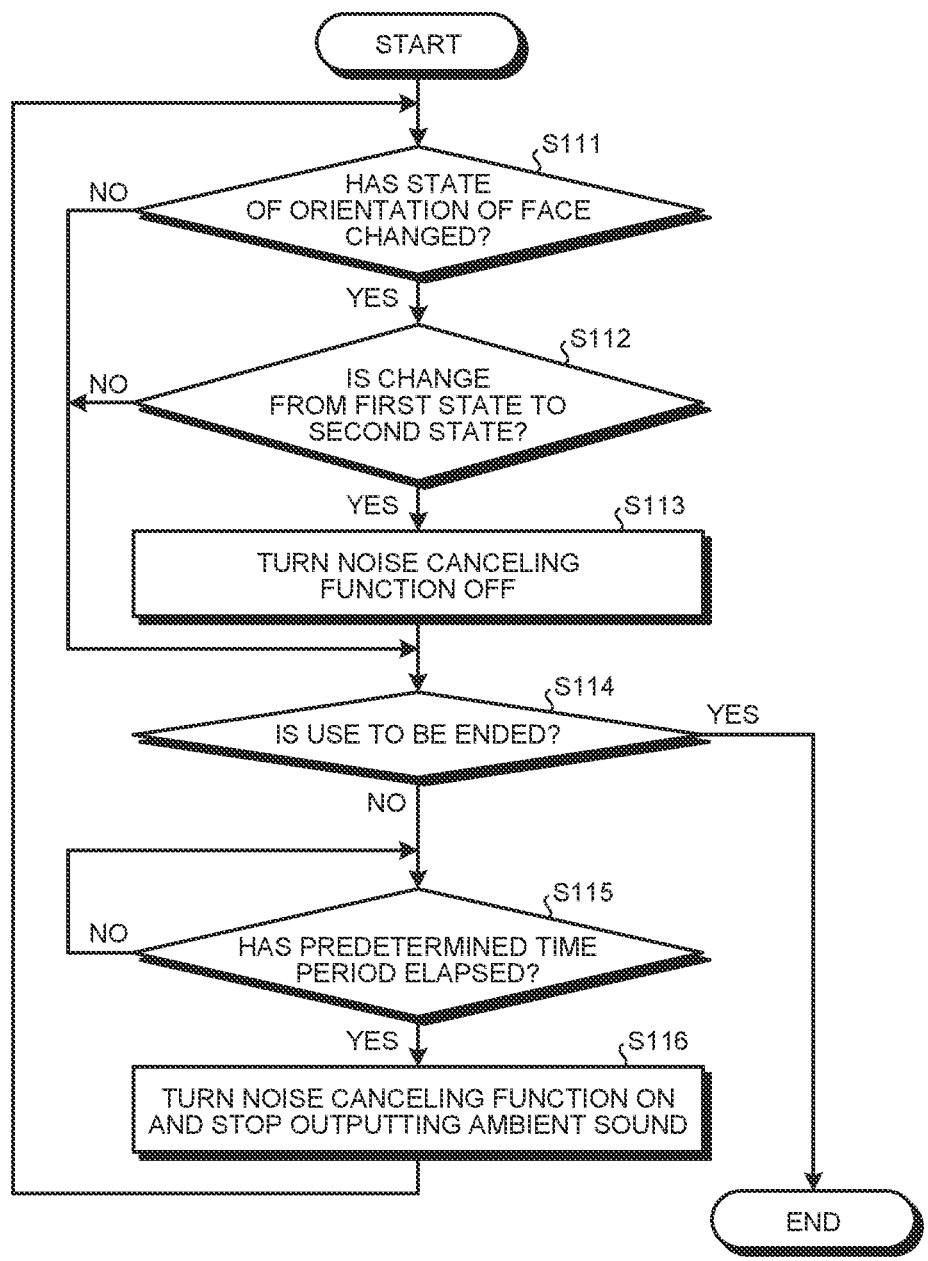
FIG. 5 is a flowchart illustrating another example of the flow of the processing in the sound output system according to the first embodiment.

Information processing at the headphones 10 will be described next by use of FIG. 4 and FIG. 5. FIG. 4 is a flowchart illustrating an example of a flow of processing in the sound output system 1 according to the first embodiment. FIG. 5 is a flowchart illustrating another example of the flow of the processing in the sound output system 1 according to the first embodiment. For example, in a case where the power of the headphones 10 is turned on, in a case where the headphones 10 are worn over the head of the user, in a case where the headphones 10 have a function of outputting sound of content, in a case where output of sound from the headphones 10 is started, or in a case where start operation for sound output control processing is performed, the processing according to the flowchart illustrated in FIG. 4 or FIG. 5 is executed. It is supposed herein that at the start of the processing of the flowchart illustrated in FIG. 4 or FIG. 5, noise canceling processing is being performed.

The processing illustrated in FIG. 4 will be described first. The sound output control device 20 determines whether or not the state of the orientation of the face of the user has changed (Step S101). More particularly, the orientation detecting unit 21 detects a posture of the headphones 10, that is, an orientation of the headphones 10, from a result of detection by the sensor 16, and determines whether or not the orientation of the headphones 10 has changed. In a case where the orientation detecting unit 21 determines that the state of the orientation of the face of the user has changed (Yes at Step S101), the processing is advanced to Step S102. In a case where the orientation detecting unit 21 determines that the state of the orientation of the face of the user has not changed (No at Step S101), the processing is advanced to Step S104. As to the determination at Step S101 on whether or not the state of the orientation of the face of the user has changed, in a case where the orientation of the face of the user has changed by, for example, 10 degrees or more with respect to at least one of the X axis direction, Y axis direction, or X axis direction, it is determined that the state of the orientation of the face of the user has changed. Or, for the determination at Step S101 on whether or not the state of the orientation of the face of the user has changed, in a case where acceleration upon change in the orientation of the face of the user is equal to or higher than the threshold, it is determined that the state of the orientation of the face of the user has changed. The threshold in this case is a threshold that enables detection of acceleration that is generated when the face of the user is suddenly directed in a different direction.

In a case where it is determined that the state of the orientation of the face of the user has changed (Yes at Step S101), the sound output control device 20 determines whether or not the change in the state of the orientation of the face of the user detected at Step S101 is a change from the first state to the second state (Step S102). More particularly, the sound output control unit 26 determines whether or not the change in the state of the orientation of the face of the user detected at Step S101 is a change from the first state where the face of the user is directed downward to the second state where the face of the user is not directed downward. Or, the sound output control unit 26 determines whether or not the change in the state of the orientation of the face of the user detected at Step S101 is a change from the first state where the acceleration caused by the change in the orientation of the face of the user is lower than the threshold to the second state where the acceleration caused by the change in the orientation of the face of the user is equal to or higher than the threshold.

In a case where it is determined that the change in the state of the orientation of the face of the user is the change from the first state to the second state (Yes at Step S102), the sound output control device 20 proceeds to Step S103. In a case where it is determined that the change in the state of the orientation of the face of the user is not the change from the first state to the second state (No at Step S102), the sound output control device 20 proceeds to Step S104.

In a case where it is determined that the change in the state of the orientation of the face of the user is the change from the first state to the second state (Yes at Step S102), the sound output control device 20 turns the noise canceling function off (Step S103). More particularly, the sound output control unit 26 turns the noise canceling function of the ambient sound reducing processing unit 25 off. The sound output control unit 26 may cause sound of content, to be output from the left sound output unit 11 and the right sound output unit 12. In this state, the sound of the content is output from the left sound output unit 11 and the right sound output unit 12 in a state where it is easy for the user to hear ambient sound. The sound output control device 20 then proceeds to Step S104.

The sound output control device 20 determines whether or not use of the headphones 10 is to be ended (Step S104). For example, in a case where the power of the headphones 10 is turned off, in a case where the headphones 10 have been removed from the head of the user, in a case where output of sound from the headphones 10 has been stopped, or in a case where end operation for sound output control processing has been performed, it is determined that the use is to be ended (Yes at Step S104) and the processing is ended. In any other case, the sound output control device 20 determines that the use is not to be ended (No at Step S104) and proceeds to Step S105.

In a case where it is determined that the use is not to be ended (No at Step S104), the sound output control device 20 determines whether or not a predetermined time period has elapsed (Step S105). More particularly, the sound output control unit 26 determines whether or not a preset time period of, for example, about 30 seconds to one minute has elapsed since the noise canceling function was turned off at Step S103. The predetermined time period in this case is, for example, a time period adequate for the user to hear ambient sound. In a case where the sound output control unit 26 determines that the predetermined time period has not elapsed (No at Step S105), the sound output control unit 26 performs the determination of Step S105 again, and in a case where the sound output control unit 26 determines that the predetermined time period has elapsed (Yes at Step S105), the processing is advanced to Step S106.

In a case where it is determined at Step S105 that the predetermined time period has elapsed (Yes at Step S105), the sound output control device 20 turns the noise canceling function on (Step S106) and the processing is advanced to Step S101.

The processing illustrated in FIG. 5 will be described next. At Step S111, Step S112, Step S114, and Step S115 of the flowchart illustrated in FIG. 5, processing similar to that of Step S101, Step S102, Step S104, and Step S105 of the flowchart illustrated in FIG. 4 is performed.

In a case where it is determined that the change in the state of the orientation of the face of the user is the change from the first state to the second state (Yes at Step S112), the sound output control device 20 turns the noise canceling function off and causes ambient sound to be output (Step S113). More particularly, the sound output control unit 26 turns the noise canceling function of the ambient sound reducing processing unit 25 off and causes ambient sound obtained by the ambient sound obtaining unit 24, to be output from the left sound output unit 11 and the right sound output unit 12. The sound output control unit 26 may cause sound of content, to be output from the left sound output unit 11 and the right sound output unit 12. In this case, in a state where ambient sound is adequately audible to the user, the ambient sound, together with the sound of the content, is output from the left sound output unit 11 and the right sound output unit 12. The sound output control device 20 then proceeds to Step S114.

In a case where it is determined at Step S115 that the predetermined time period has elapsed (Yes at Step S115), the sound output control device 20 turns the noise canceling function on and causes the output of ambient sound to be stopped (Step S116), and the processing is then advanced to Step S111.

As described above, in a case where the orientation of the face of the user wearing the headphones 10 has changed from the first state to the second state, in a case where the face of the user has changed from the state of being directed downward to the state of not being directed downward, or in a case where acceleration caused by change in the orientation of the face of the user is equal to or higher than the threshold, audibility of ambient sound is made higher than that in a state where ambient sound has been reduced.

Effects

As described above, in a case where the orientation of the face of the user has changed from the first state to the second state, in a case where the face of the user has changed from the state of being directed downward to the state of not being directed downward, or in a case where acceleration caused by change in the orientation of the face of the user is equal to or higher than the threshold, the first embodiment enables audibility of ambient sound to be made higher than that in a state where ambient sound has been reduced. According to this first embodiment, in a case where it is presumed that the user's attention has been directed to the surrounds, ambient sound is able to be heard by the user more adequately than in a case where ambient sound has been subjected to noise canceling. Accordingly, the first embodiment enables ambient sound to be heard adequately by the user when the user desires to hear the ambient sound.

According to this first embodiment, in a case where the orientation of the face of the user has changed from the first state to the second state, in a case where the face of the user has changed from the state of being directed downward to the state of not being directed downward, or in a case where acceleration caused by change in the orientation of the face of the user is equal to or higher than the threshold, audibility of ambient sound is made higher than that in a state where ambient sound has been reduced. In any of these cases, the user's attention has likely been directed to the surrounds. According to this first embodiment, in a case where the user has likely directed the user's attention to the surrounds, the noise canceling function is turned off for ambient sound to be made audible to the user.

According to this first embodiment, in the state where audibility of ambient sound is higher than that in a state where ambient sound has been reduced, the ambient sound reducing processing by the ambient sound reducing processing unit 25 is not performed, or ambient sound obtained by the ambient sound obtaining unit 24 is output from the left sound output unit 11 and the right sound output unit 12 without the ambient sound reducing processing. The first embodiment enables ambient sound to be audible.

The orientation of the face of the user changing from the first state to the second state corresponds to, for example, the user's action of looking up to obtain information on stops during an announcement in a means of transportation from a state where the user has taken a seat in the means of transportation and is facing downward while listening to music with the headphones 10. By doing this action, the orientation of the face of the user changes from the first state to the second state.

Second Embodiment

Figure 6:
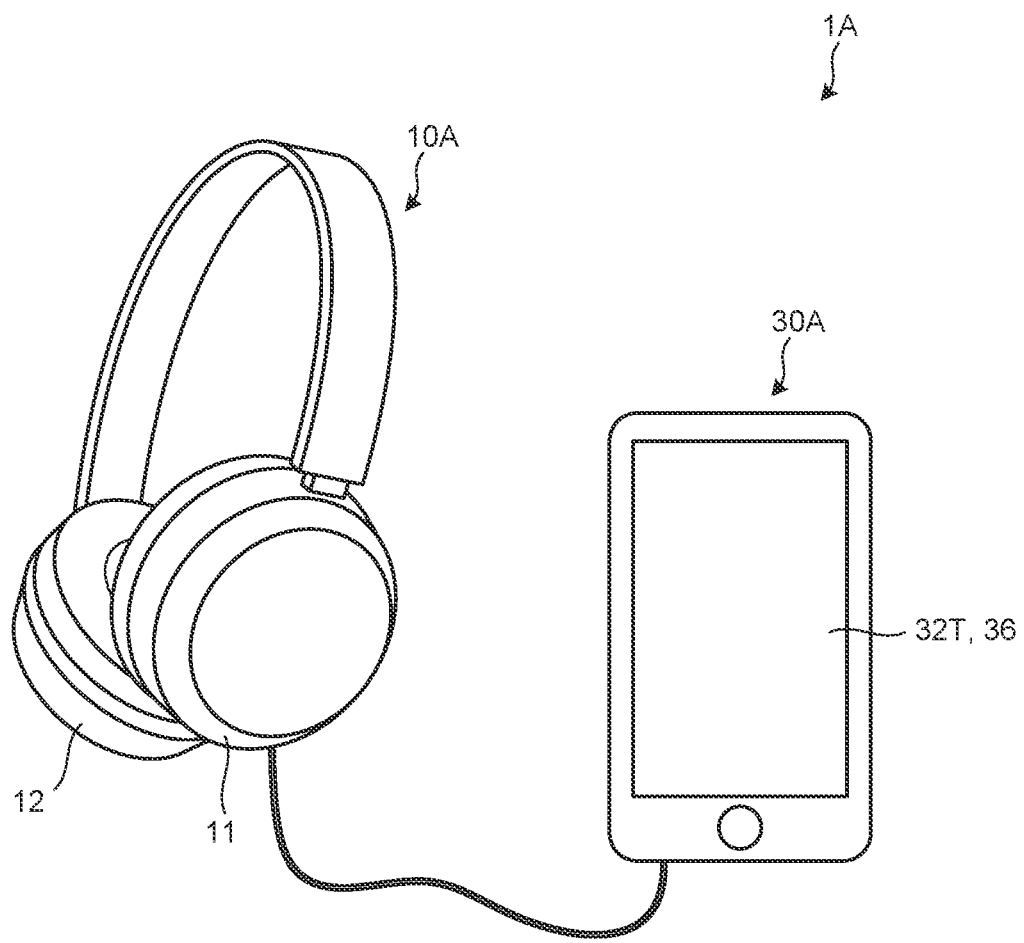
FIG. 6 is a schematic diagram of a sound output system according to a second embodiment.
Figure 7:
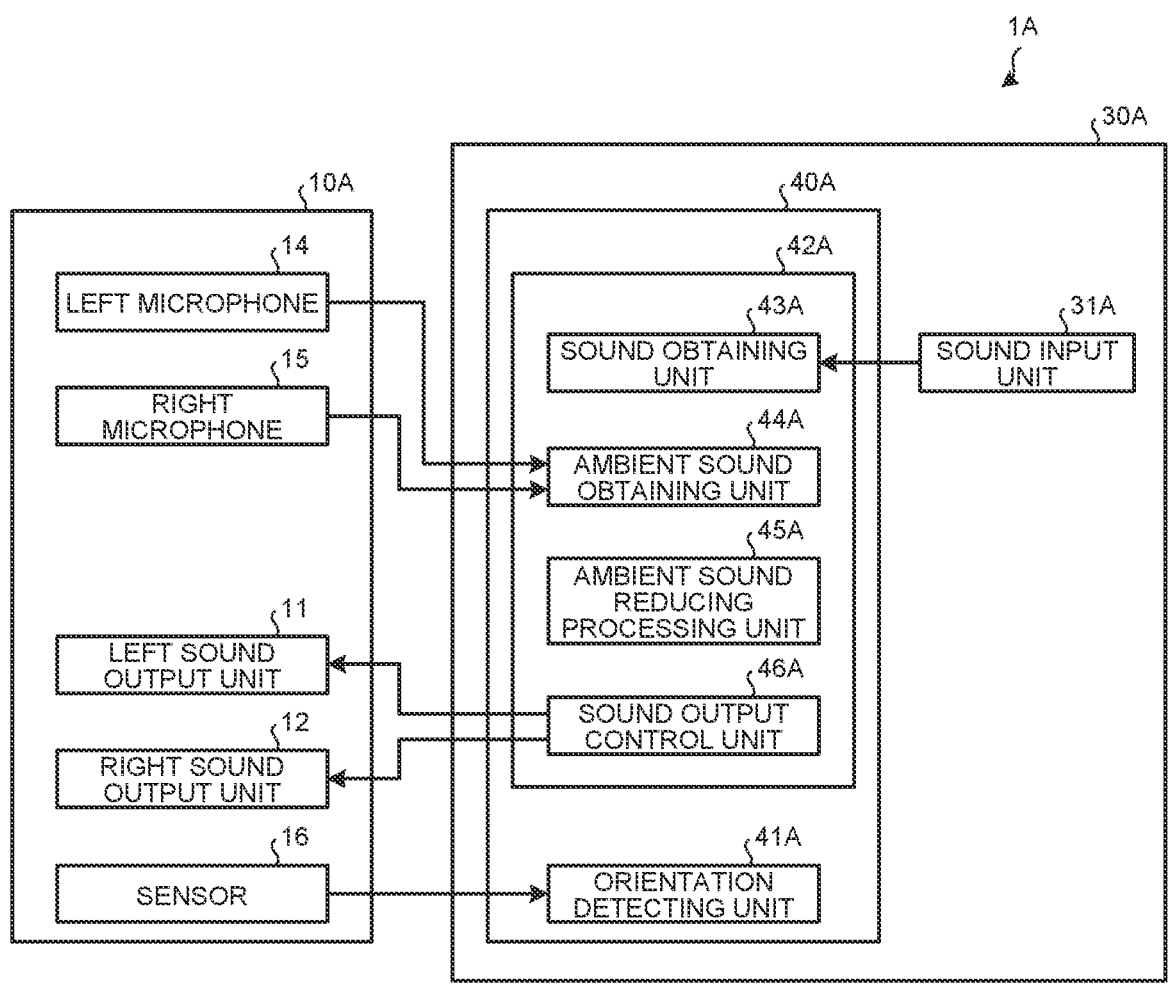
FIG. 7 is a block diagram of the sound output system according to the second embodiment.

FIG. 6 is a schematic diagram of a sound output system 1A according to a second embodiment. FIG. 7 is a block diagram of the sound output system 1A according to the second embodiment. The sound output system 1A includes headphones 10A serving as a sound output device, and an electronic device 30A, such as, for example, an electronic book device, a smartphone, a tablet terminal, a portable music playback device, or a portable game console. In other words, the sound output system 1A is a combination of: the headphones 10A serving as a sound output device; and the electronic device 30A.

The headphones 10A are connected to the electronic device 30A by wire or wirelessly to be able to transmit and receive data to and from the electronic device 30A. The headphones 10A output a sound signal output from the electronic device 30A.

The electronic device 30A includes: a sound input unit 31A having functions similar to those of the sound input unit 13; and a sound output control device 40A having functions similar to those of the sound output control device 20.

A configuration of the headphones 10A in FIG. 7 is equivalent to a configuration included in the configuration of the headphones 10 illustrated in FIG. 1. Furthermore, the sound output control device 40A included the electronic device 30A in FIG. 7 corresponds to the sound output control device 20 included in the headphones 10 illustrated in FIG. 1, and a sound processing unit 42A included in the electronic device 30A corresponds to the sound processing unit 22 of the headphones 10. Similarly, a sound obtaining unit 43A corresponds to the sound obtaining unit 23, an ambient sound obtaining unit 44A corresponds to the ambient sound obtaining unit 24, an ambient sound reducing processing unit 45A corresponds to the ambient sound reducing processing unit 25, a sound output control unit 46A corresponds to the sound output control unit 26, an orientation detecting unit 41A corresponds to the orientation detecting unit 21, and these units included in the electronic device 30A are respectively configured equivalently to those included in the headphones 10.

As described above, the combination of the electronic device 30A and the headphones 10A serving as a sound output device, like this second embodiment, also enables ambient sound to be adequately heard, similarly to the first embodiment.

Third Embodiment

Figure 8:
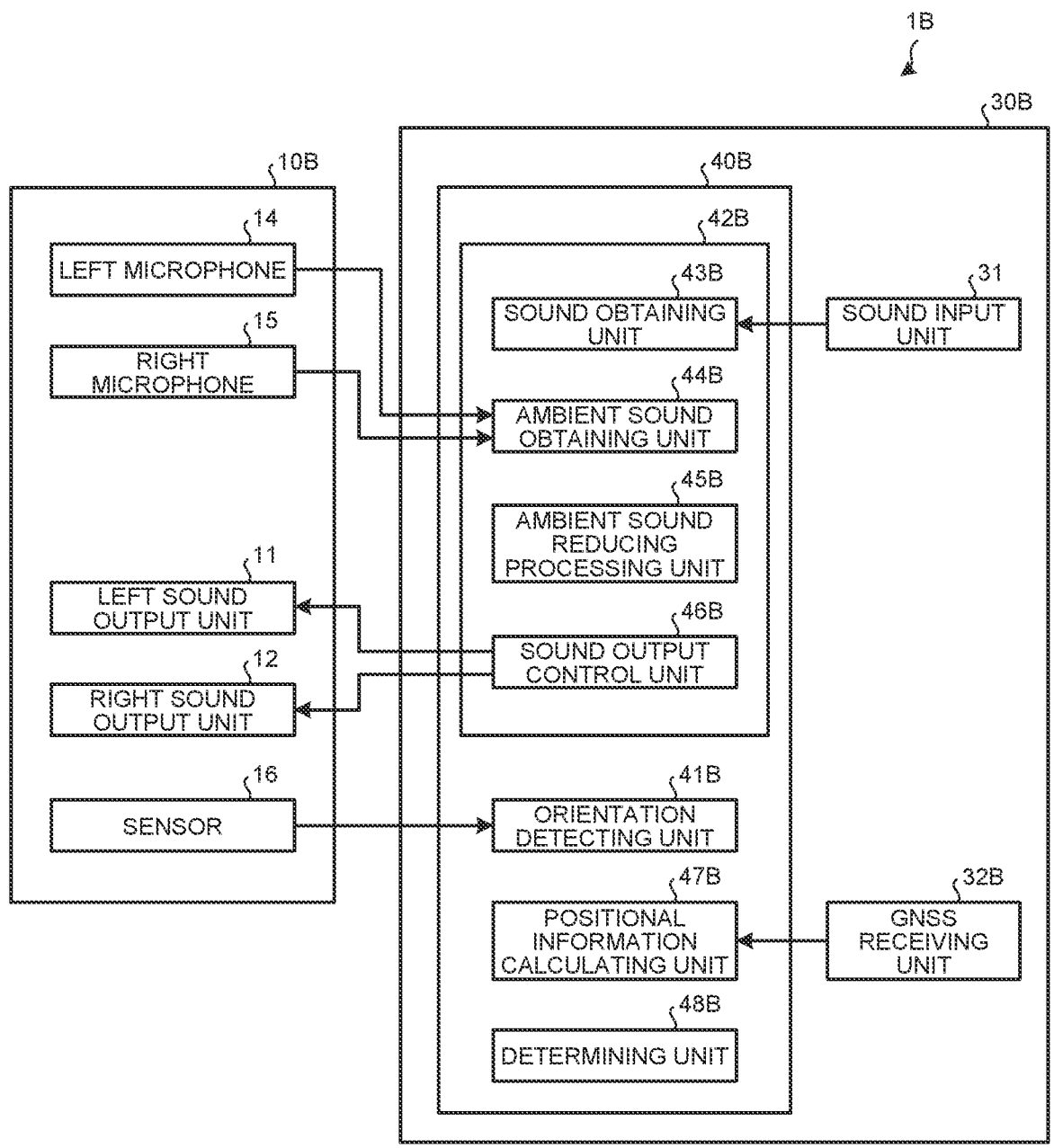
FIG. 8 is a block diagram of a sound output system according to a third embodiment.
Figure 9:
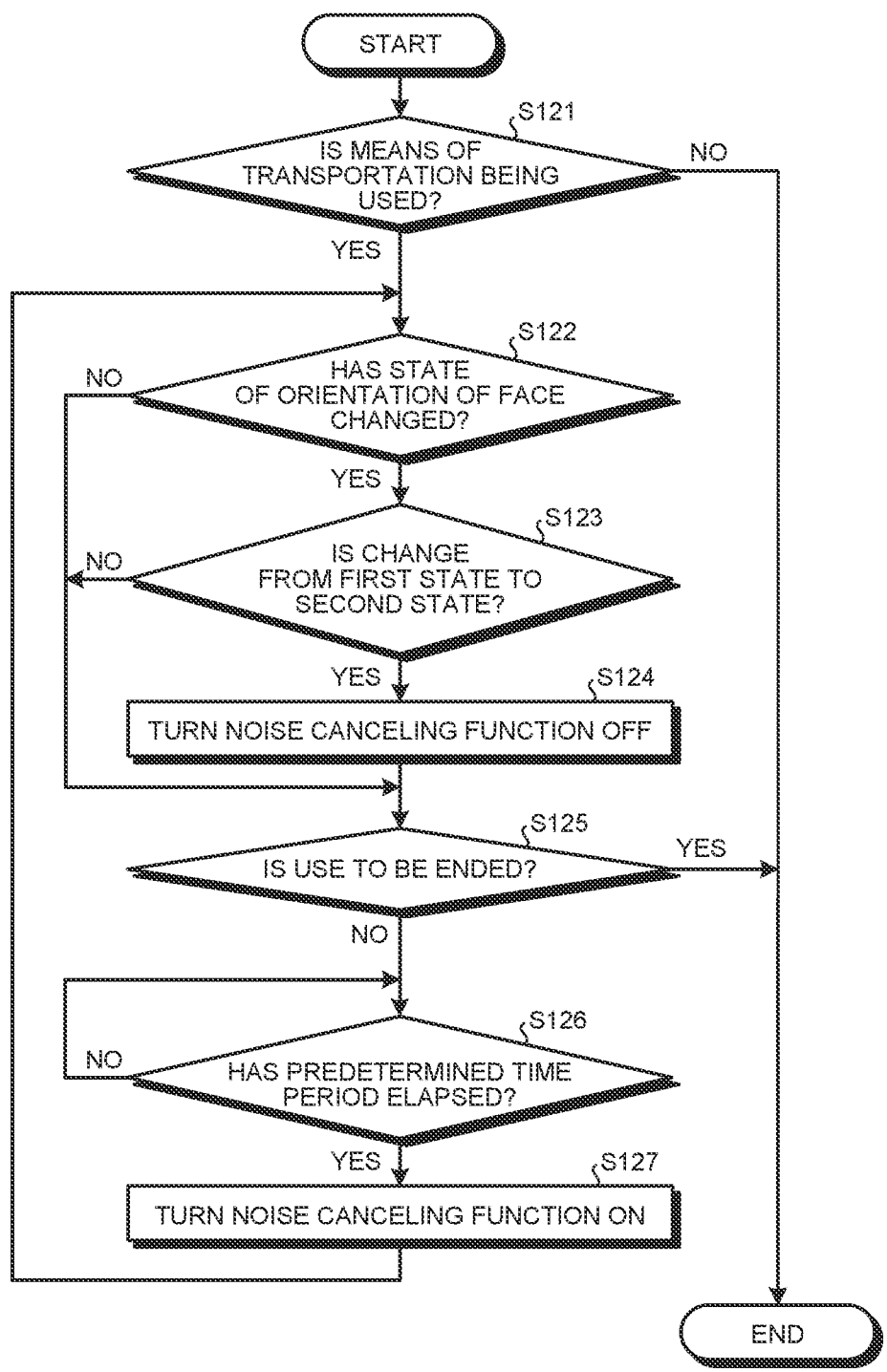
FIG. 9 is a flowchart illustrating an example of a flow of processing in the sound output system according to the third embodiment.

A sound output system 1B according to a third embodiment will be described by reference to FIG. 8 and FIG. 9. FIG. 8 is a block diagram of the sound output system 1B according to the third embodiment. FIG. 9 is a flowchart illustrating an example of a flow of processing in the sound output system 1B according to the third embodiment. The basic configuration of the sound output system 1B is similar to that of the sound output system 1A according to the second embodiment. In this third embodiment, an electronic device 30B includes a global navigation satellite system (GLASS) receiving unit 32B, a positional information calculating unit 47B, and a determining unit 48B.

The GNSS receiving unit 32B includes a GNSS receiver that receives GNSS signals from a GNSS satellite. The GNSS receiving unit 32B outputs the GNSS signals received, to the positional information calculating unit 47B.

The positional information calculating unit 47B receives a GNSS signal from the GNSS receiving unit 32B. On the basis of the GNSS signal, the positional information calculating unit 47B calculates current positional information. The positional information calculating unit 47B and the GNSS receiving unit 32B may be compatible with any other positioning satellite system, without being limited to GNSS signals.

The determining unit 48B determines whether or not a user is using a means of transportation. For example, on the basis of positional information calculated by the positional information calculating unit 47B, the determining unit 48B may determine that the user is using a means of transportation in a case where the current position of the user wearing headphones 10B corresponds to positional information of the means of transportation from map information not illustrated in the drawings, or on the basis of a movement history or moving velocity. A method of determining, at the determining unit 48B, whether a means of transportation is being used is not limited. For example, whether a means of transportation is being used may be determined by any other method in which, for example, ambient noise or vibration of the headphones 10B is used.

Information processing in the sound output system 1B will be described next by use of FIG. 9. At Step S122 to Step S124, Step S126, and Step S127 of the flow chart illustrated in FIG. 9, processing similar to that at Step S101 to Step S103, Step S105, and Step S106 of the flowchart illustrated in FIG. 4 is performed.

A sound output control device 40B determines whether or not a means of transportation is being used (Step S121). More particularly, on the basis of a result of determination based on positional information calculated by the positional information calculating unit 47B, the determining unit 48B determines that a means of transportation is being used. This result indicates, for example, that the current position of the user corresponds to positional information of the means of transportation from map information. In a case where the determining unit 48B determines that a means of transportation is being used (Yes at Step S121), the processing is advanced to Step S122. In a case where the determining unit 48B determines that a means of transportation is not being used (No at Step S121), the processing is ended.

Determination at Step S125 on whether use is to be ended includes determination by the sound output control device 40B on whether or not use of the means of transportation is to be ended, in addition to determination on whether use of the headphones 10B or the electronic device 30B is to be ended (Step S125). More particularly, the determining unit 48B determines that use of the means of transportation is to be ended in response to detection by the determining unit 48B of end of the use of the means of transportation on the basis of positional information calculated by the positional information calculating unit 47B. This detection of the end of the use of the means of transportation is made in a case where the current position of the user deviates from positional information of the means of transportation from map information. In a case where the determining unit 48B determines that the use of the means of transportation is to be ended (Yes at Step S125), the processing is ended. In a case where the determining unit 48B determines that the use of the means of transportation is not to be ended (No at Step S125), the processing is advanced to Step S126.

Effects

As described above, in a case where the user wearing the headphones 10B is using a means of transportation and: orientation of the face of the user has changed from the first state to the second state; the face of the user has changed from the state of being directed downward to the state of not being directed downward; or acceleration caused by change in orientation of the face of the user is equal to or higher than the threshold, the third embodiment enables ambient sound to be more easily heard by the user than in a state where ambient sound has been reduced. This third embodiment enables ambient sound, such as an announcement, to be easily heard by the user wearing the headphones 10B in a case where the user looks up to listen to the announcement while the user is using the means of transportation. The third embodiment prevents the noise canceling function from being needlessly turned off.

Fourth Embodiment

Content Output System

Figure 10:
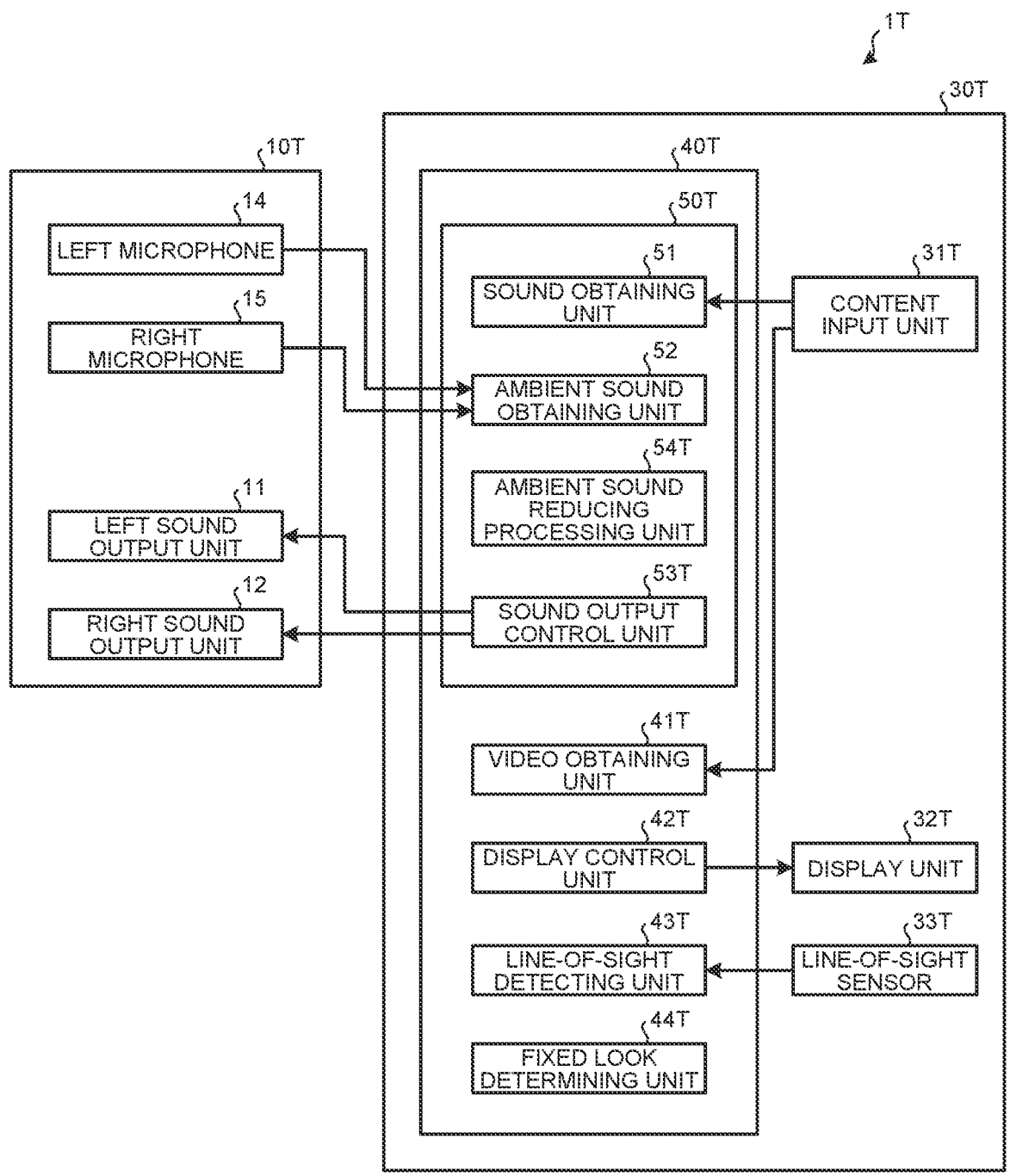
FIG. 10 is a block diagram illustrating a content output system according to a fourth embodiment.

FIG. 10 is a block diagram illustrating a content output system 1T according to a fourth embodiment. A content output control device 40T that is one embodiment of a sound output control device will be described with respect to this fourth embodiment. The content output system 1T is one embodiment of a sound output system. The same applies to the following embodiments. The content output control device 40T corresponds to the sound output control device and the content output system 1T corresponds to the sound output system. In the following description, the same or corresponding reference sign will be assigned to or the corresponding relation will be described for any component that is similar to that of the sound output systems and sound output control devices according to the first embodiment to third embodiment and detailed description of that component will be omitted. The content output system 1T includes headphones 10T serving as a sound output device, and an electronic device 30T that plays back and displays content including a video and sound. The electronic device 30T is, for example, an electronic book device, a smartphone, a tablet terminal, a portable music playback device, or a portable game console. In other words, the content output system 1T is a combination of: the headphones 10T serving as the sound output device; and the electronic device 30T. In the content output system 1T, sound is output from the headphones 10T and noise from ambient sound is canceled, according to a direction of a line of sight of a user.

Headphones

On the basis of sound data output from the content output control device 40T of the electronic device 30T, the headphones 10T output sound related to content displayed on a display screen 36. On the basis of a control signal output from the content output control device 40T, the headphones 10T are able to cancel ambient noise. The headphones 10T are connected to the electronic device 30T by wire or wirelessly to be able to transmit and receive data to and from the electronic device 30T. The headphones 10T include a left sound output unit 11, a right sound output unit 12, a left microphone 14, a right microphone 15, and the content output control device 40T. The headphones 10T are configured similarly to the headphones 10A according to the second embodiment and are different from the headphones 10A in that the headphones 10T do not include a sensor.

Electronic Device

The electronic device 30T includes a content input unit 31T, a display unit 32T (see FIG. 6), a line-of-sight sensor 33T, and the content output control device 40T.

The content input unit 31T corresponds to the sound input unit 31A according to the second embodiment. Content data input to the content input unit 31T is, for example, content data including sound output, and may be movie content, game content, or Web content.

The content data includes video data and sound data both related to content. Video data related to content is video data on content to be displayed on the display screen 36. Sound data related to the content is sound data for sound output correspondingly to the video data for the content displayed on the display screen 36. The sound data related to the content may be, for example, text-to-speech reading sound of an electronic book, text-to speech reading of a Web page, or commentary sound.

The line-of-sight sensor 33T is arranged to be directed in the same direction as the display screen 36 of the electronic device 30T. The line-of-sight sensor 33T is a sensor that detects a line of sight of a person facing the display screen 36 of the electronic device 30T. In a state where the user is viewing the display screen 36, the line-of-sight sensor 33T is arranged at a position where the line-of-sight sensor 33T faces the face of the user. The line-of-sight sensor 33T is arranged, for example, at an upper portion of the display screen 36 of the electronic device 30T. The line-of-sight sensor 33T outputs captured data that has been captured, to a line-of-sight detecting unit 43T of the content output control device 40T.

The line-of-sight sensor 33T includes, for example, an infrared light emitting unit including a group of infrared LEDs and a pair of infrared cameras. In the line-of-sight sensor 33T according to this fourth embodiment, infrared light is emitted in the direction of the face of the user by a pair of infrared light emitting units and videos are captured by the infrared cameras. On the basis of positions of the pupils of the eyes of the user and corneal reflection from the videos shot by the infrared cameras, the line-of-sight detecting unit 431 described later determines whether or not the line of sight of the user is directed to the display screen 36. Furthermore, on the basis of the positions of the pupils of the eyes of the user and corneal reflection, the position of the line of sight of the user on the display screen 36 is determined. The line-of-sight sensor 33T may have any other configuration having similar functions, and thus may include, for example, a visible light camera.

The display unit 32T displays a video of content input to the content input unit 31T. The display unit 32T is a display that may be, for example, a liquid crystal display (LCD), or an organic electro-luminescence display. On the basis of display data output from a display control unit 421, the display unit 32T displays the video of the content. The display unit 32T includes the display screen 36 where the video is displayed.

The headphones 10T may include a sensor that detects whether or not the headphones 10T are being worn over the head of the user. Specifically, the headphones 10T may include a triaxial accelerometer, and the headphones 10T may be determined to be worn over the head of the user on the basis of the direction in which the gravitational acceleration is being detected. In addition, another sensor may be used to detect, for example, how much the headband is open or pressure on the ear pads. The sensor may be configured similarly to the sensor 16 according to the second embodiment, for example.

Content Output Control Device

The content output control device 40T causes sound to be output from the headphones 10T and ambient noise to be canceled. According to the direction of a line of sight of the user, the content output control device 40T causes sound to be output with ambient sound that has been reduced, or makes audibility of ambient sound higher than that in a state where ambient sound has been reduced. The content output control device 40T includes a video obtaining unit 41T, the display control unit 42T, the line-of-sight detecting unit 43T, a fixed look determining unit 44T, a sound processing unit 50T, and a storage unit that is an internal memory. The sound processing unit 50T corresponds to the sound processing unit 22 according to the first embodiment. The content output control device 40T may include one or plural devices.

The video obtaining unit 41T obtains video data for content to be output on the display screen 36 of the display unit 32T, from the content input unit 31T.

The display control unit 42T causes the video data for the content obtained by the video obtaining unit 41T, to be displayed on the display screen 36 of the display unit 32T.

On the basis of captured data captured by the line-of-sight sensor 33T, the line-of-sight detecting unit 43I detects the direction of a line of sight of the user. A method of detecting the line of sight is not limited, but in this fourth embodiment, the line of sight is detected by corneal reflection.

On the basis of a result of detection by the line-of-sight detecting unit 43I, the fixed look determining unit 44I determines whether or not the user is looking fixedly at the display screen 36 of the electronic device 30T where the content is being displayed. The user is looking fixedly at the display screen 36 if a state where the display screen 36 is positioned in the direction of the line of sight of the user, that is, a state where the line of sight of the user and the display screen 36 intersect is maintained for a first predetermined time period or longer. The first predetermined time period is, for example, about five seconds. The user is not looking fixedly at the display screen 36 if a state where the line of sight of the user is directed in a different direction different from the direction of the display screen 36, in other words, a state where the line of sight of the user and the display screen 36 do not intersect is maintained for a second predetermined time period or longer. The second predetermined time period is, for example, about five seconds.

On the basis of ambient sound obtained by an ambient sound obtaining unit 52, an ambient sound reducing processing unit 54I performs processing of reducing ambient sound for sound output by the left sound output unit 11 and the right sound output unit 12 that output the sound to the user. On the basis of the ambient sound obtained by the ambient sound obtaining unit 52, the ambient sound reducing processing unit 54I reduces the ambient sound by performing noise canceling for the ambient sound. Any publicly known method is applicable as a method for the noise canceling. A signal resulting from inversion of the phase of the ambient sound is caused by the sound output control unit 26, to be output.

A sound output control unit 53T causes sound to be output with ambient sound obtained by the ambient sound obtaining unit 52. A state of output of this ambient sound in a case where the fixed look determining unit 44I determines that the user is looking fixedly at the display screen 36 displaying content is different from that in a case where the fixed look determining unit 44I determines that the user is not looking fixedly at the display screen 36. In this fourth embodiment, in a case where the fixed look determining unit 44I determines that the user is looking fixedly at the display screen 36 displaying content, the sound output control unit 53T causes sound to be output with ambient sound that has been reduced by the ambient sound reducing processing unit 54I, and in a case where the fixed look determining unit 44I determines that the user is not looking fixedly at the display screen 36 displaying the content, the sound output control unit 53T makes audibility of the ambient sound higher than that in a state where ambient sound has been reduced by the ambient sound reducing processing unit 54I.

Figure 11:
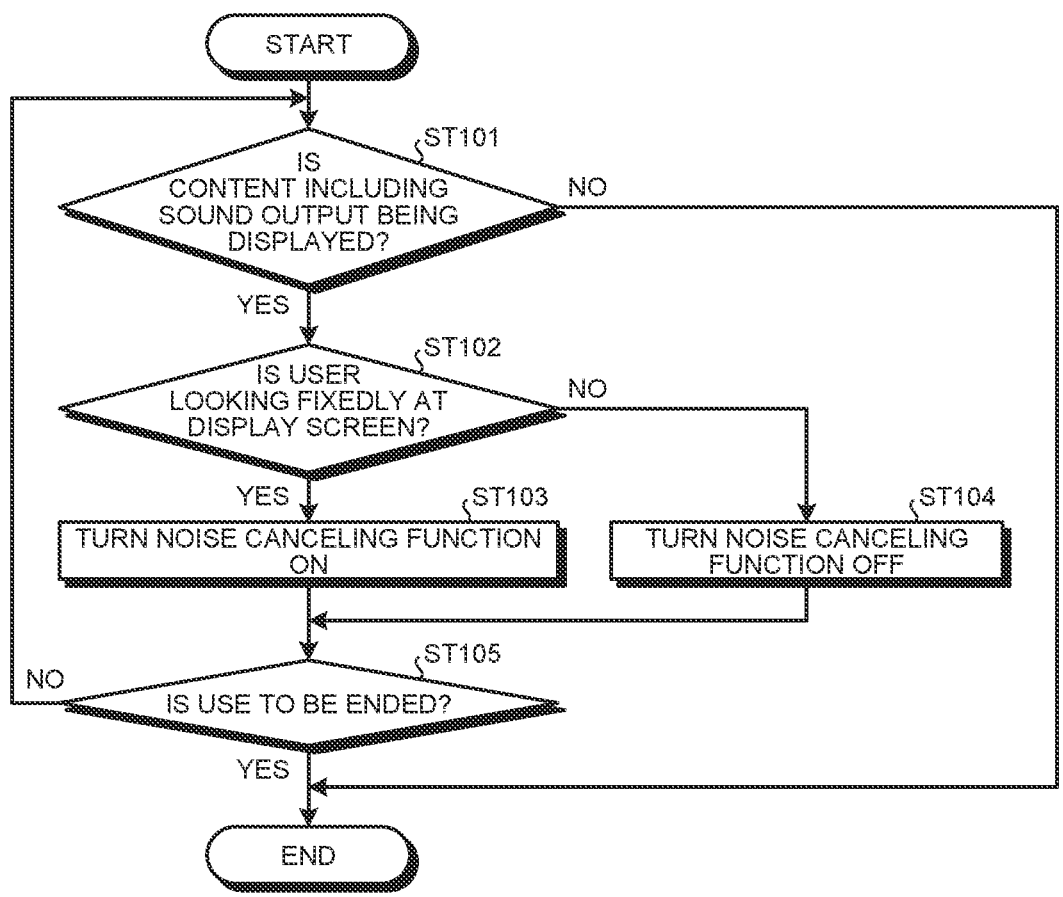
FIG. 11 is a flowchart illustrating an example of a flow of processing in the content output system according to the fourth embodiment.
Figure 12:
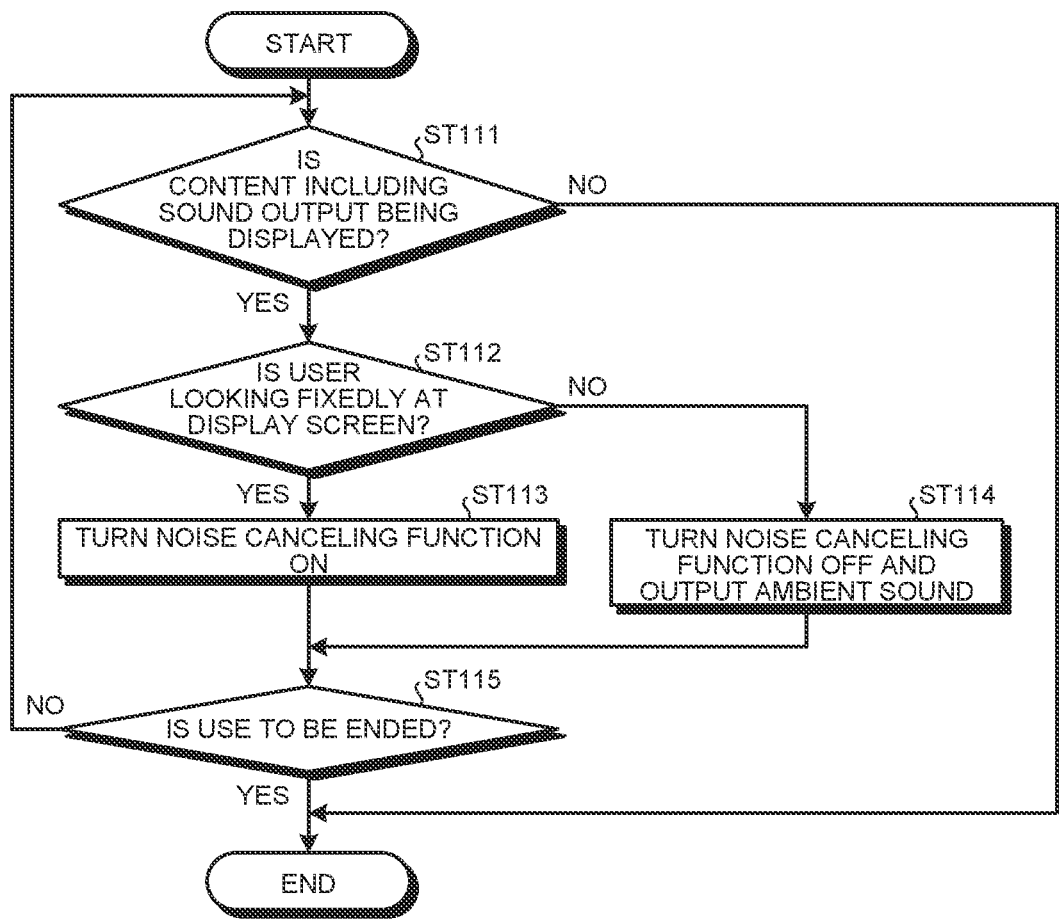
FIG. 12 is a flowchart illustrating another example of the flow of the processing in the content output system according to the fourth embodiment.

Information processing at the headphones 10T will be described next by use of FIG. 11 and FIG. 12. FIG. 11 is a flowchart illustrating an example of a flow of processing in the content output system 1T according to the fourth embodiment. FIG. 12 is a flowchart illustrating another example of the flow of the processing in the content output system 1T according to the fourth embodiment. For example, in a case where the power of the headphones 10T is turned on, in a case where the headphones 10T are worn over the head of the user, in a case where output of sound from the headphones 10T is started, or in a case where start operation for content output control processing is performed, the processing according to the flowchart illustrated in FIG. 11 or FIG. 12 is executed.

The processing illustrated in FIG. 11 will be described first. The content output control device 40I determines whether or not content including sound output is being displayed by the display unit 32T (Step ST101). More particularly, the content output control device 40I determines whether or not content input to the content input unit 31T and including sound and a video is being played back, the video of the content is being displayed by the display unit 32T, and the sound of the content is being output to the headphones 10T. In other words, the content output control device 40I determines whether or not content including sound and a video is being played back. A state where content including sound output is being displayed by the display unit 32T is a state where a video of the content is being displayed by the display unit 32T and sound of the content is being output to the headphones 10T, and these display and output are continued until playback of the content is ended.

In a case where it is determined that content including sound output is being displayed by the display unit 32T (Yes at Step ST101), the processing is advanced to Step ST102. In a case where it is determined that content including sound output is not being displayed by the display unit 32T (No at Step ST101), the processing is ended. In the case where it is determined that content including sound output is being displayed by the display unit 32T (Yes at Step ST101), it is determined whether or not the user is looking fixedly at the display screen 36 (Step ST102). More particularly, on the basis of a result of detection by the line-of-sight detecting unit 43I, the fixed look determining unit 44I determines whether or not the user is looking fixedly at the display screen 36 of the electronic device 30T where the content is being displayed. In a case where the fixed look determining unit 44I determines that the user is looking fixedly at the display screen 36 (Yes at Step ST102), the processing is advanced to Step ST103. In a case where the fixed look determining unit 44I determines that the user is not looking fixedly at the display screen 36 (No at Step ST102), the processing is advanced to Step ST104.

In a case where it is determined that the user is looking fixedly at the display screen 36 (Yes at Step ST102), the content output control device 401 turns the noise canceling function on (Step ST102). More particularly, the sound output control unit 53T causes the ambient sound reducing processing unit 541 to perform noise canceling. The sound output control unit 53T may cause the sound of content, to be output from the left sound output unit 11 and the right sound output unit 12. In this state, the sound of content is output from the left sound output unit 11 and the right sound output unit 12. The content output control device 401 then proceeds to Step ST105.

At Step ST103: in a case where the noise canceling function has been turned on already since the determination, "Yes", at Step ST101, the noise canceling function is maintained on; and in a case where the noise canceling function has been turned off since the determination, "Yes", at Step ST101, the noise canceling function is turned on.

In a case where it is determined that the user is not looking fixedly at the display screen 36 (No at Step ST102), the content output control device 401 turns the noise canceling function off (Step ST104). More particularly, the sound output control unit 53T causes the noise canceling function of the ambient sound reducing processing unit 541 to be turned off. The sound output control unit 53T may cause the sound of content, to be output from the left sound output unit 11 and the right sound output unit 12. In this case, in a state where ambient sound is easily heard by the user, the sound of the content is output from the left sound output unit 11 and the right sound output unit 12. The content output control device 401 then proceeds to Step ST105.

At Step ST104: in a case where the noise canceling function has been turned on already since the determination, "Yes", at Step ST101, the noise canceling function is turned off; and in a case where the noise canceling function has been turned off since the determination, "Yes", at Step ST101, the noise canceling function is maintained off.

The content output control device 401 determines whether or not use of the content output system 1T, such as use of the headphones 10T and the electronic device 30T, is to be ended (Step ST105). For example, in a case where the power of the headphones 10T or the electronic device 30T has been turned off, in a case where the headphones 10T have been removed from the head of the user, in a case where output of sound to the headphones 10T has been stopped, or in a case where ending operation for content output control processing has been performed, the content output control device 401 determines that the use is to be ended (Yes at Step ST105) and ends the processing. In any other case, the content output control device 401 determines that the use is not to be ended (No at Step ST105) and executes the processing of Step ST101 again.

The processing illustrated in FIG. 12 will be described next. At Step ST111, Step ST112, Step ST113, and Step ST115 of the flowchart illustrated in FIG. 12, processing similar to that of Step ST101, Step ST102, Step ST103, and Step ST105 of the flowchart illustrated in FIG. 11 is performed.

In a case where it is determined that the user is not looking fixedly at the display screen 36 (No at Step ST112), the content output control device 401 turns the noise canceling function off and outputs ambient sound (Step ST114). More particularly, the sound output control unit 53T causes the noise canceling function of the ambient sound reducing processing unit 541 to be turned off and causes ambient sound obtained by the ambient sound obtaining unit 52, to be output from the left sound output unit 11 and the right sound output unit 12. The sound output control unit 53T may cause the sound of content to be output from the left sound output unit 11 and the right sound output unit 12. In this case, in a state where ambient sound is easily heard by the user, the ambient sound, together with the sound of content, is output from the left sound output unit 11 and the right sound output unit 12. The content output control device 401 then proceeds to Step ST115.

At Step ST113: in a case where the noise canceling function has been turned on already since the determination, "Yes", at Step ST111, the noise canceling function is maintained on; and in a case where the noise canceling function has been turned off since the determination, "Yes", at Step ST111, the noise canceling function is turned on and output of ambient sound is stopped.

At Step ST114: in a case where the noise canceling function has been turned on already since the determination, "Yes", at Step ST111, the noise canceling function is turned off and ambient sound is output; and in a case where the noise canceling function was off at the time of the determination, "Yes", at Step ST111 and ambient sound is being output, the noise canceling function is maintained off and the output of ambient sound is continued.

As described above, in a case where the user wearing the headphones 10T is looking fixedly at the display screen 36, ambient sound is reduced, and in a case where the user wearing the headphones 10T is not looking fixedly at the display screen 36, audibility of ambient sound is made higher than that in a state where ambient sound has been reduced.

Effects

As described above, according to the fourth embodiment, in a case where the user wearing the headphones 10T is looking fixedly at the display screen 36, ambient sound is reduced, and in a case where the user is not looking fixedly at the display screen 36, audibility of ambient sound is able to be made higher than that in a state where ambient sound has been reduced. According to this fourth embodiment, in a case where the user is presumed to have stopped looking fixedly at the display screen 36 and directed the user's attention to the surrounds, the user is able to hear ambient sound more adequately than in a state where ambient sound has been subjected to noise canceling. Accordingly, the fourth embodiment enables the user to hear ambient sound adequately even if the user does not perform any operation when the user desires to hear the ambient sound.

According to this fourth embodiment, in the state where audibility of ambient sound is higher than that in the state where ambient sound has been reduced, the ambient sound reducing processing by the ambient sound reducing processing unit 541 is not performed, or ambient sound obtained by the ambient sound obtaining unit 52 is output from the left sound output unit 11 and the right sound output unit 12 without the ambient sound reducing processing. The fourth embodiment enables audibility of ambient sound to be increased.

Fifth Embodiment

Figure 13:
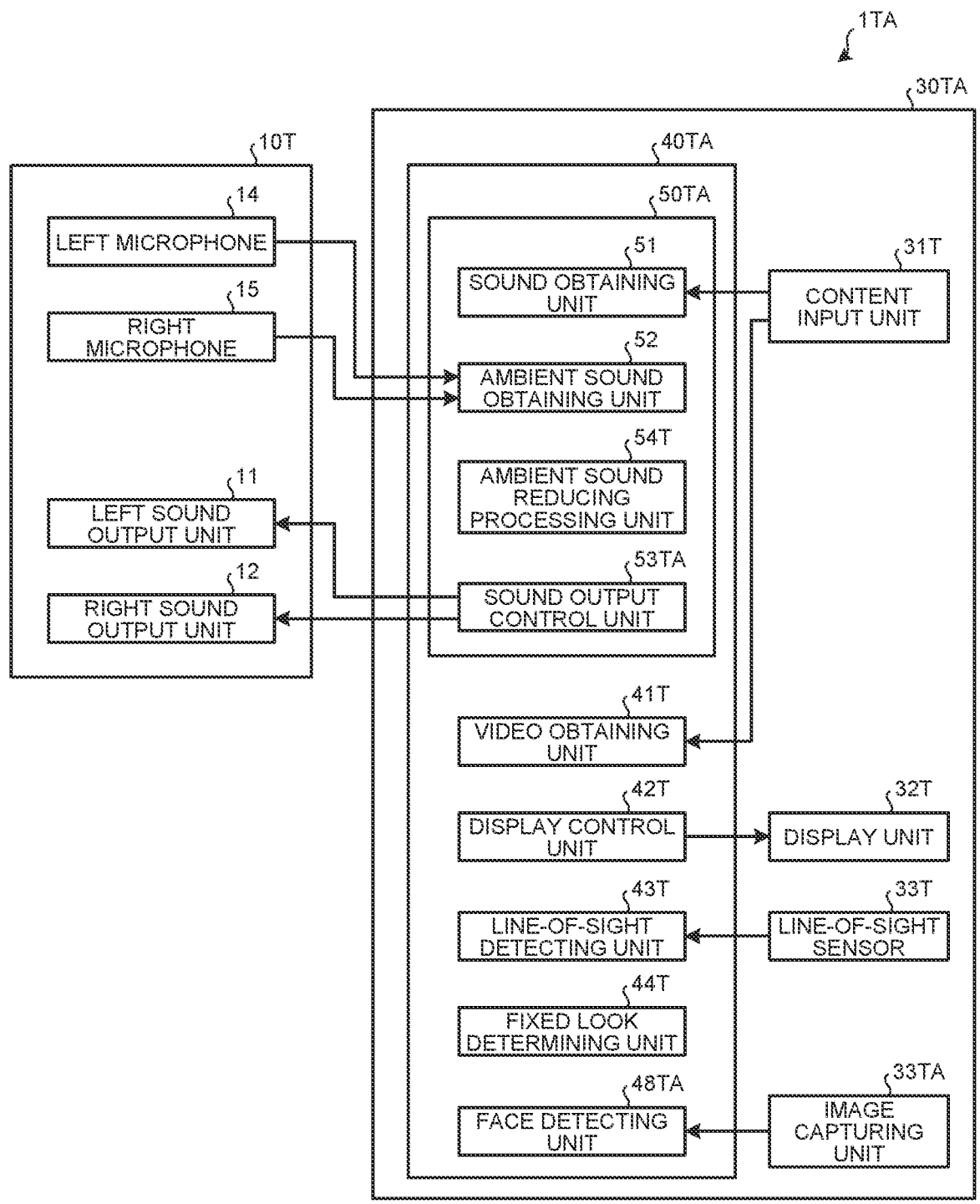
FIG. 13 is a block diagram of a content output system according to a fifth embodiment.
Figure 14:
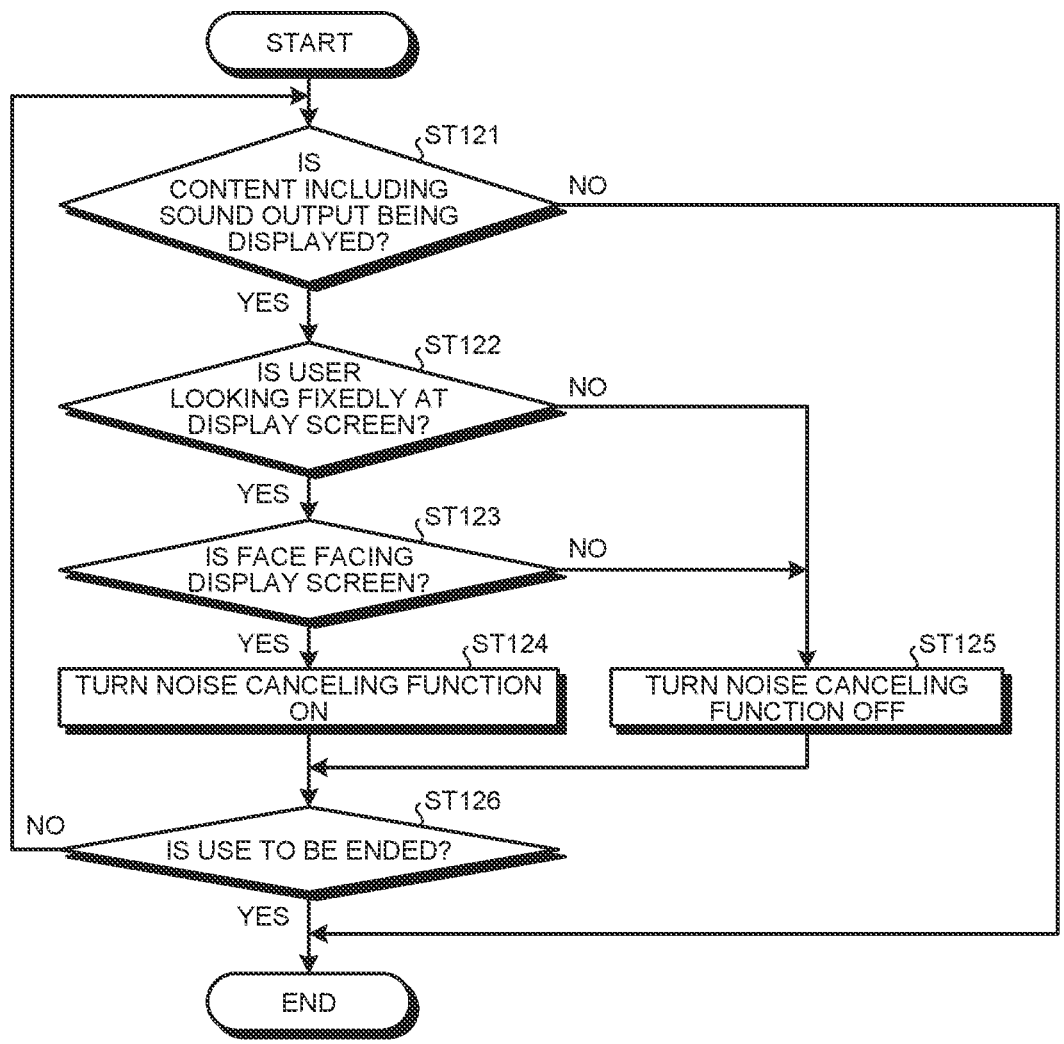
FIG. 14 is a flowchart illustrating an example of a flow of processing in the content output system according to the fifth embodiment.

A content output system 1TA according to a fifth embodiment will be described while reference is made to FIG. 13 to FIG. 14. FIG. 13 is a block diagram illustrating the content output system 1TA according to the fifth embodiment. FIG. 14 is a flowchart illustrating an example of a flow of processing in the content output system 1TA according to the fifth embodiment. The basic configuration of the content output system 1TA is similar to that of the content output system 1T according to the fourth embodiment. In the following description, any component that is similar to that of the content output system 1T will be assigned with the same reference sign or a corresponding reference sign, and detailed description thereof will be omitted. The fifth embodiment is different from the fourth embodiment in that an electronic device 30TA according to the fifth embodiment includes an image capturing unit 33TA, as well as a face detecting unit 48TA of a content output control device 40TA, and in processing at a sound output control unit 53TA.

The image capturing unit 33TA is a visible light camera that captures an image of a person facing a display screen 36 of the electronic device 30TA. The image capturing unit 33TA captures an image of the face of a user. In a state where the user is viewing the display screen 36, the image capturing unit 33TA is placed at a position where the image capturing unit 33TA is able to capture an image of the face of the user. The image capturing unit 33TA is arranged, for example, at an upper portion of the display screen 36 of the electronic device 30TA. The image capturing unit 33TA outputs captured data that has been captured, to the face detecting unit 48TA of the content output control device 40TA. The image capturing unit 33TA and a line-of-sight sensor 33T may be the same visible light camera.

The face detecting unit 48TA recognizes the face of the user from the captured data captured by the image capturing unit 33TA and detects an orientation of the face recognized. More particularly, the face detecting unit 48TA detects whether or not the face detected by the face detecting unit 48TA is orientated to face the display screen 36. For example, in a case where the user is viewing the display screen 36 where content is displayed, the face of the user is orientated to face the display screen 36. For example, in a case where the user is directing the user's attention to the surrounds and looking around the surrounds, the face of the user is not orientated to face the display screen 36.

Being orientated to face the display screen 36 means being orientated to enable the user to view an image of the content displayed on the display screen 36, for example. The orientation where the face faces the display screen 36 may be defined, for example, as an orientation where the user is presumed evidently to be looking at the display screen 36, like when angles at which straight lines passing the centers of the eyes of the user and extending forward from the user intersect the display screen 36 are in a range of about 90°±30°, the centers being the centers of dimensions of the eyes, the dimensions being along the vertical direction and the horizontal direction.

In a case where a fixed look determining unit 441 determines that the user is looking fixedly at the display screen 36 displaying content and the orientation of the face detected by the face detecting unit 48TA is the orientation where the face faces the display screen 36, the sound output control unit 53TA causes sound to be output with ambient sound that has been reduced by an ambient sound reducing processing unit 541. In a case where the fixed look determining unit 441 determines that the user is not looking fixedly at the display screen 36 displaying the content and the orientation of the face detected by the face detecting unit 48TA is not the orientation where the face faces the display screen 36, the sound output control unit 53TA makes audibility of ambient sound higher than that in a state where ambient sound has been reduced by the ambient sound reducing processing unit 541. Even in a case where the user is not looking fixedly at the display screen 36 displaying the content, if the face of the user is facing the display screen 36, it is presumed that the user intends to continue viewing the content. In this case, reduction of ambient sound is preferably continued. On the contrary, in a case where the user is not looking fixedly at the display screen 36 displaying the content and the face of the user does not face the display screen 36, the user is presumed to be paying the user's attention more to the surrounds. In this case, ambient sound is preferably made audible.

Information processing in the content output system 1TA will be described next by use of FIG. 14. At Step ST121, Step ST122, and Step ST124 to Step ST126 of the flowchart illustrated in FIG. 14, processing similar to that of Step ST101, Step ST102, and Step ST103 to Step ST105 of the flowchart illustrated in FIG. 11 is performed.

The content output control device 40TA determines whether or not the face of the user is facing the display screen 36 (Step ST123). More particularly, in a case where the orientation of the face detected by the face detecting unit 48TA is the orientation where the face faces the display screen 36 (Yes at Step ST123), the processing is advanced to Step ST124. In a case where the orientation of the face detected by the face detecting unit 48TA is not the orientation where the face faces the display screen 36 (No at Step ST123), the processing is advanced to Step ST125.

Effects

As described above, according to the fifth embodiment, in a case where the user is looking fixedly at the display screen 36 and the face of the user is facing the display screen 36, ambient sound is reduced, and in a case where the user is not looking fixedly at the display screen 36 and the face of the user is not facing the display screen 36, audibility of ambient sound is made higher than that in a state where ambient sound has been reduced. This fifth embodiment enables ambient sound to be adequately heard in a state where the user has changed the orientation of the face to the orientation where the face does not face the display screen 36 and the user has directed the user's attention to the surrounds.

Sixth Embodiment

Figure 15:
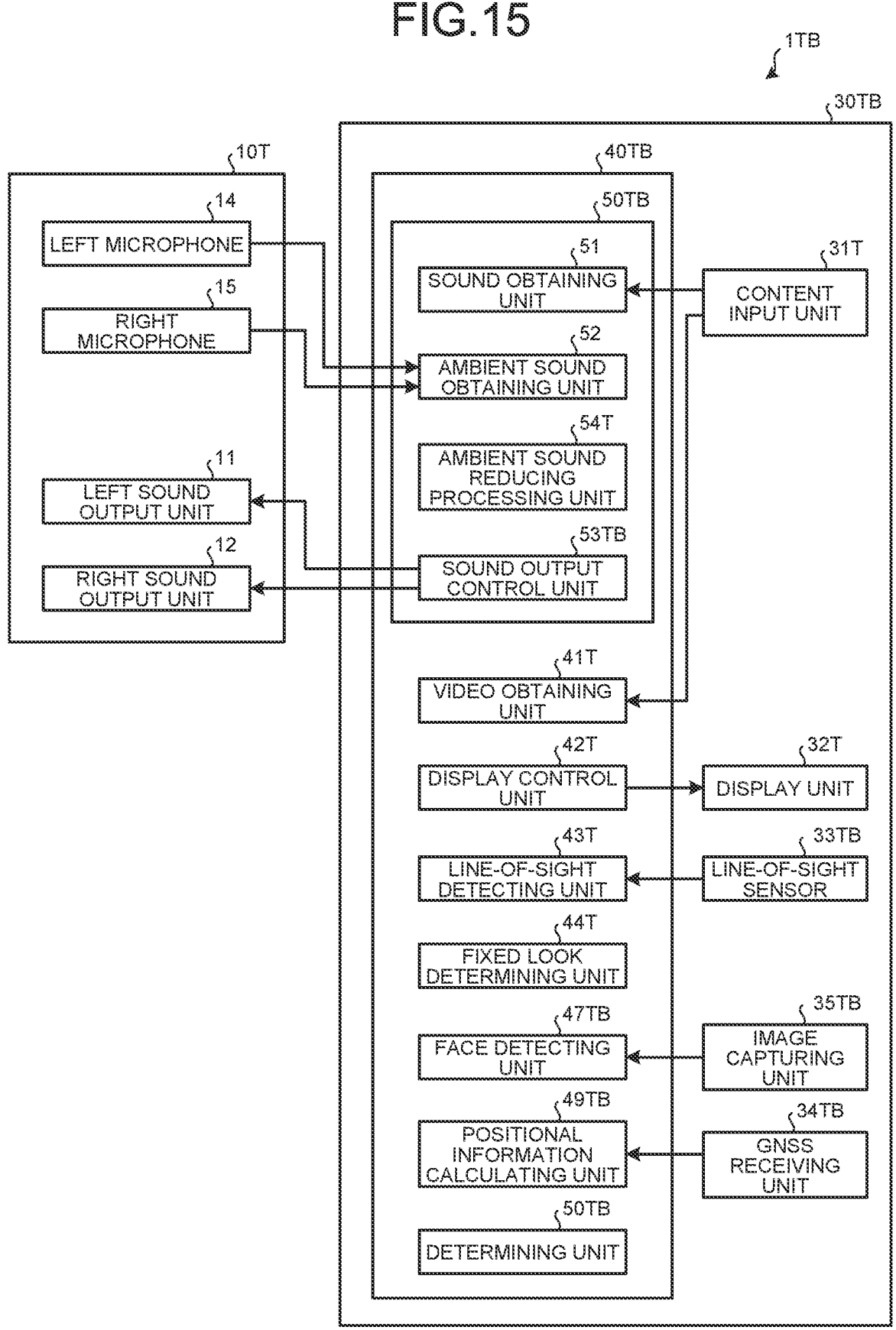
FIG. 15 is a block diagram of a content output system according to a sixth embodiment.
Figure 16:
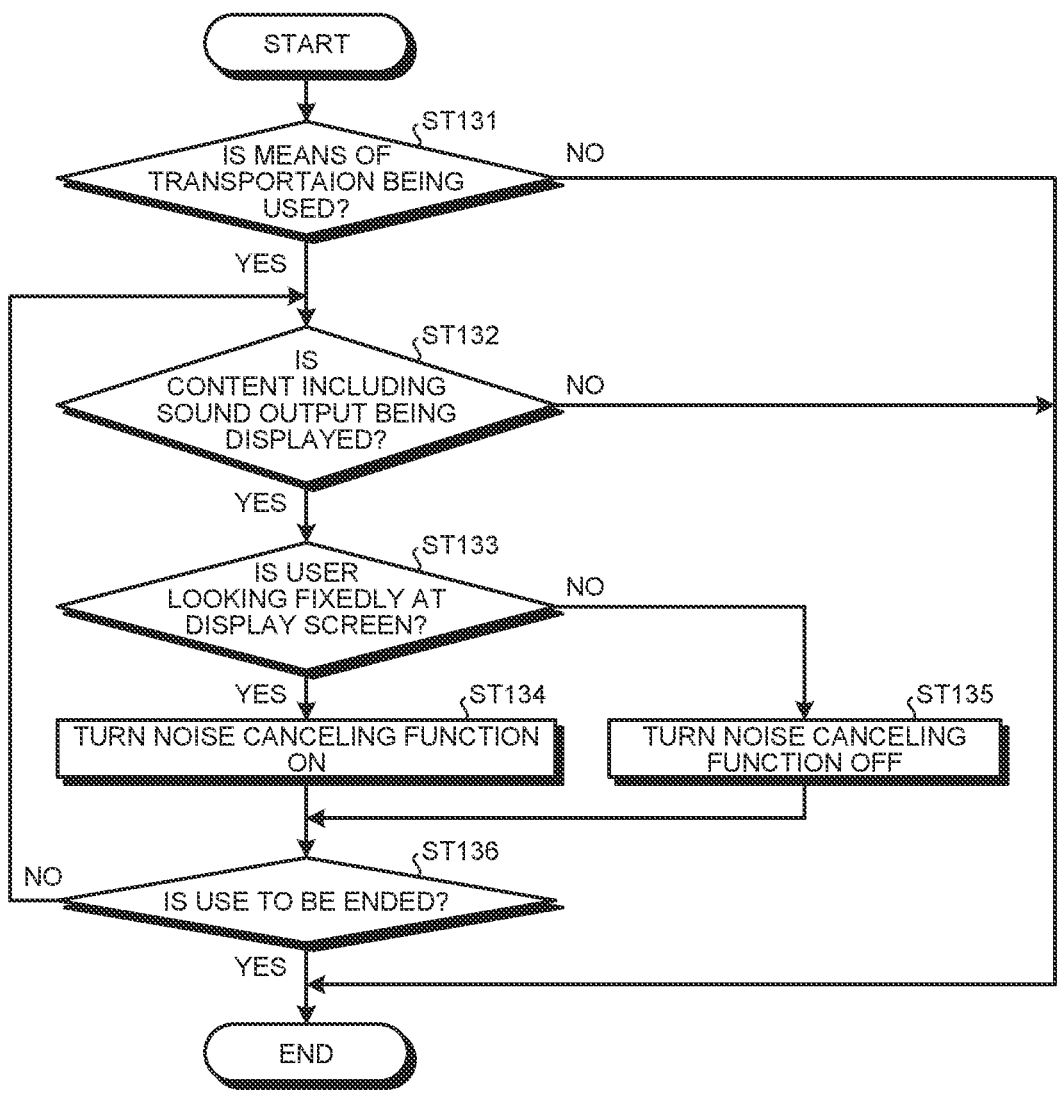
FIG. 16 is a flowchart illustrating an example of a flow of processing in the content output system according to the sixth embodiment.

A content output system 1TB according to a sixth embodiment will be described while reference is made to FIG. 15 to FIG. 16. FIG. 15 is a block diagram illustrating the content output system 1TB according to the sixth embodiment. FIG. 16 is a flowchart illustrating an example of a flow of processing in the content output system 1TB according to the sixth embodiment. The basic configuration of the content output system 1TB is similar to that of the content output system 1TA according to the fifth embodiment illustrated in FIG. 13. The sixth embodiment is different from the fourth embodiment in that an electronic device 30TB according to the sixth embodiment includes a GNSS receiving unit 34TB, a positional information calculating unit 49TB and a determining unit 50TB in a content output control device 40TB, and in processing at a sound output control unit 53TB.

The GNSS receiving unit 34TB is configured similarly to the GNSS receiving unit 32B according to the third embodiment.

The positional information calculating unit 49TB is configured similarly to the positional information calculating unit 47B according to the third embodiment.

The determining unit 50TB is configured similarly to the determining unit 48B according to the third embodiment.

When a user is using a means of transportation: in a case where it is determined that the user is looking fixedly at a display screen 36 displaying content, the sound output control unit 53TB causes sound to be output with ambient sound that has been reduced by an ambient sound reducing processing unit 54T; and in a case where it is determined that the user is not looking fixedly at the display screen 36 displaying the content, the sound output control unit 53TB makes audibility of ambient sound higher than that in a state where ambient sound has been reduced by the ambient sound reducing processing unit 54T.

Information processing in the content output system 1TB will be described next by use of FIG. 16. At Step ST131 and Step ST136 of the flowchart illustrated in FIG. 16, processing similar to that of Step S121 and Step S125 of the flowchart illustrated in FIG. 9 is performed. At Step ST132 to Step ST135 of the flowchart illustrated in FIG. 16, processing similar to that of Step ST101 to Step ST104 of the flowchart illustrated in FIG. 11 is performed.

Effects

As described above, according to this sixth embodiment, when the user wearing headphones 10T is using a means of transportation: in a case where the user is looking fixedly at the display screen 36, ambient sound is reduced; and in a case where the user is not looking fixedly at the display screen 36, audibility of ambient sound is able to be made higher than that in a state where ambient sound has been reduced. In a case where the user wearing the headphones 10T changes the orientation of the face to an orientation where the face faces the display screen 36 in order to listen to an announcement while the user is using the means of transportation, for example, the sixth embodiment enables audibility of ambient sound, such as the announcement, to be made higher. The sixth embodiment prevents the noise canceling function from being needlessly turned off.

Seventh Embodiment

Content Output System

Figure 17:
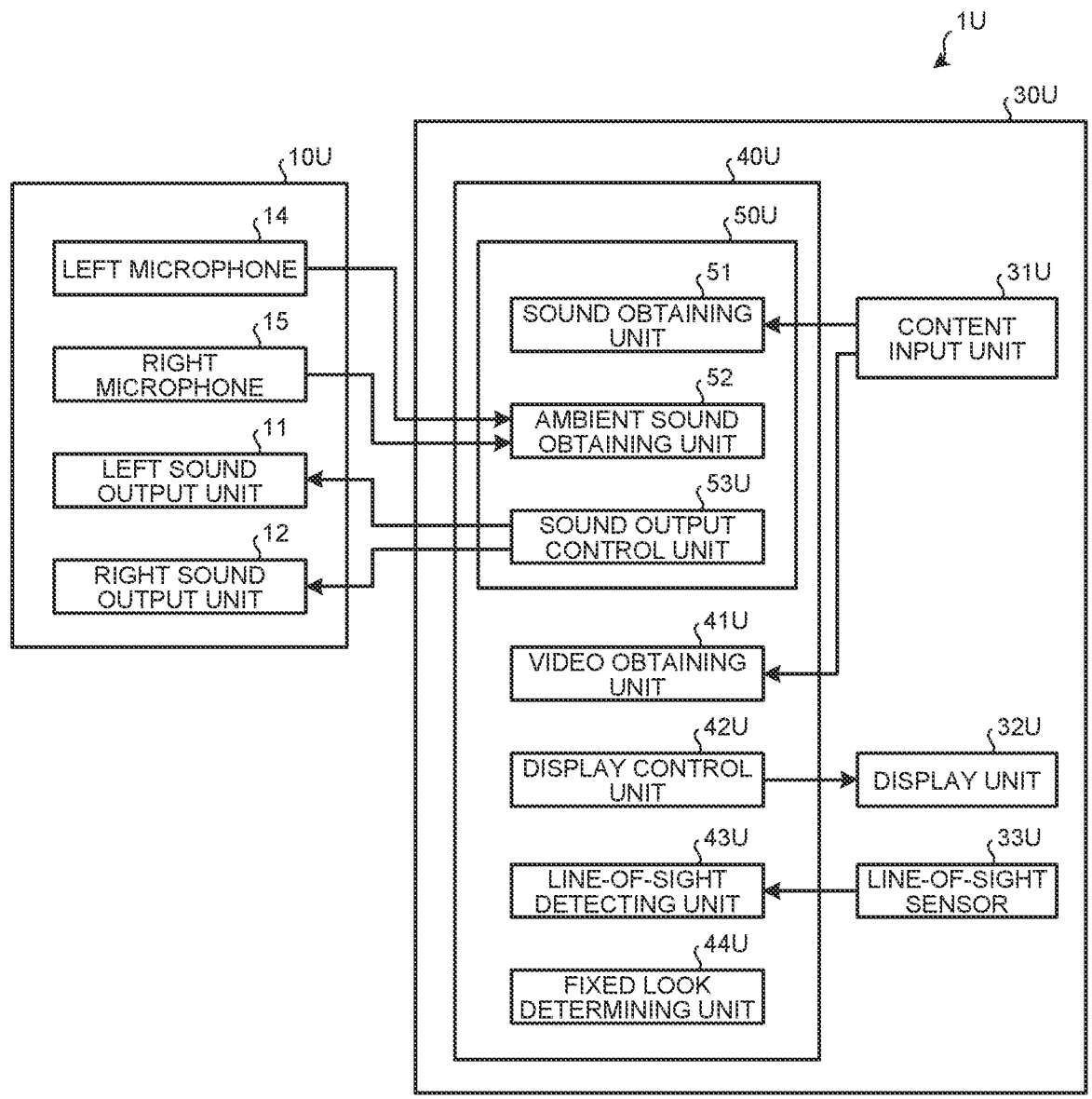
FIG. 17 is a block diagram illustrating a content output system according to a seventh embodiment.

FIG. 17 is a block diagram illustrating a content output system 1U according to a seventh embodiment. In the content output system 1U, according to whether or not a user is looking fixedly at a display screen 36, sound related to content displayed on the display screen 36 is caused to be output or ambient sound is caused to be output, from headphones 10U. A sound processing unit 50U of a content output control device 40U in the content output system 1U is different from that according to the fourth embodiment.

Content Output Control Device

The content output control device 40U causes the sound related to the content, to be output or the ambient sound to be output, from the headphones 10U, according to whether or not the user is looking fixedly at the display screen 36.

The sound processing unit 50U includes: a sound obtaining unit 51 and an ambient sound obtaining unit 52 that are configured similarly to those according to the fourth embodiment; and a sound output control unit 53U.

The sound output control unit 53U causes sound to be output with ambient sound obtained by the ambient sound obtaining unit 52. A state of output of this ambient sound in a case where a fixed look determining unit 44U determines that the user is looking fixedly at the display screen 36 displaying content is made different, by the sound output control unit 53U, from that in a case where the fixed look determining unit 44U determines that the user is not looking fixedly at the display screen 36. In this seventh embodiment, in a case where the fixed look determining unit 44U determines that the user is looking fixedly at the display screen 36 displaying the content, the sound output control unit 53U causes sound related to the content obtained by the sound obtaining unit 51, to be output, and in a case where the fixed look determining unit 44U determines that the user is not looking fixedly at the display screen 36 displaying the content, the sound output control unit 53U causes ambient sound obtained by the ambient sound obtaining unit 52, to be output.

In a case where the fixed look determining unit 44U determines that the user is not looking fixedly at the display screen 36 displaying the content, the sound output control unit 53U may cause the ambient sound obtained by the ambient sound obtaining unit 52, to be output, in addition to the sound related to the content obtained by the sound obtaining unit 51. In this case, the ambient sound, together with the sound related to the content, is output from the headphones 10U.

Figure 18:
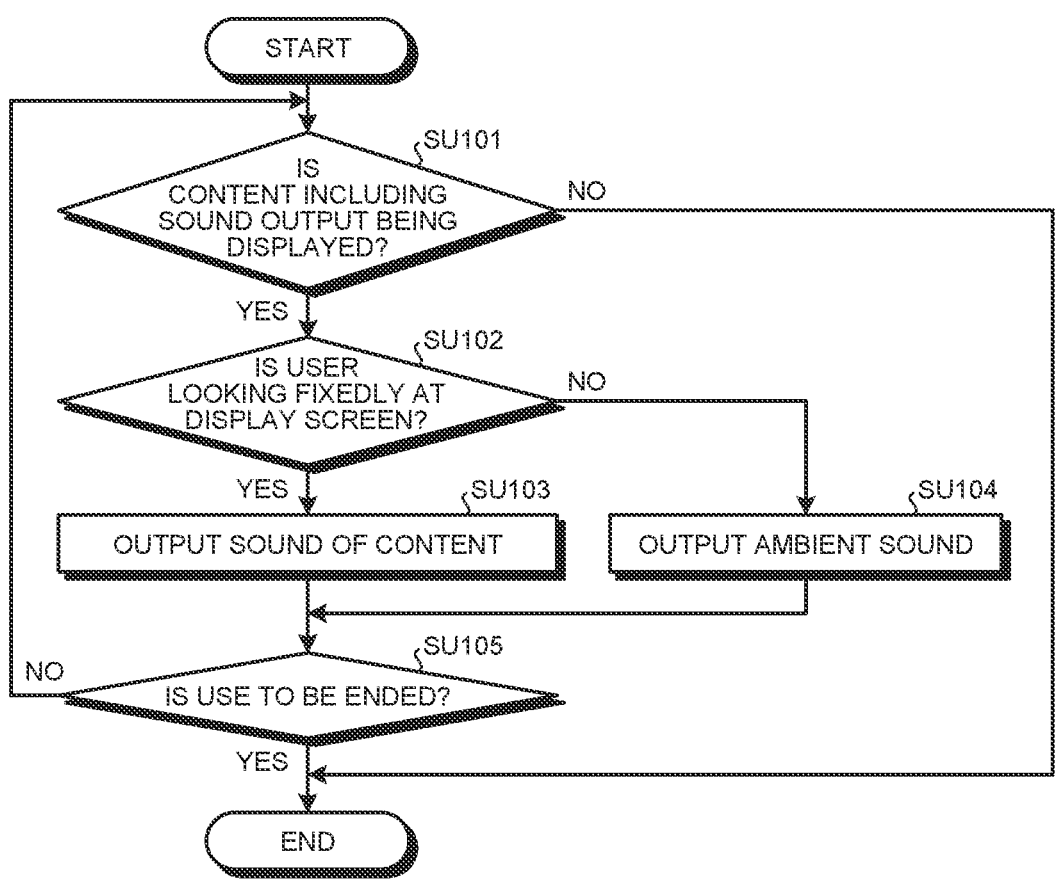
FIG. 18 is a flowchart illustrating an example of a flow of processing in the content output system according to the seventh embodiment.
Figure 19:
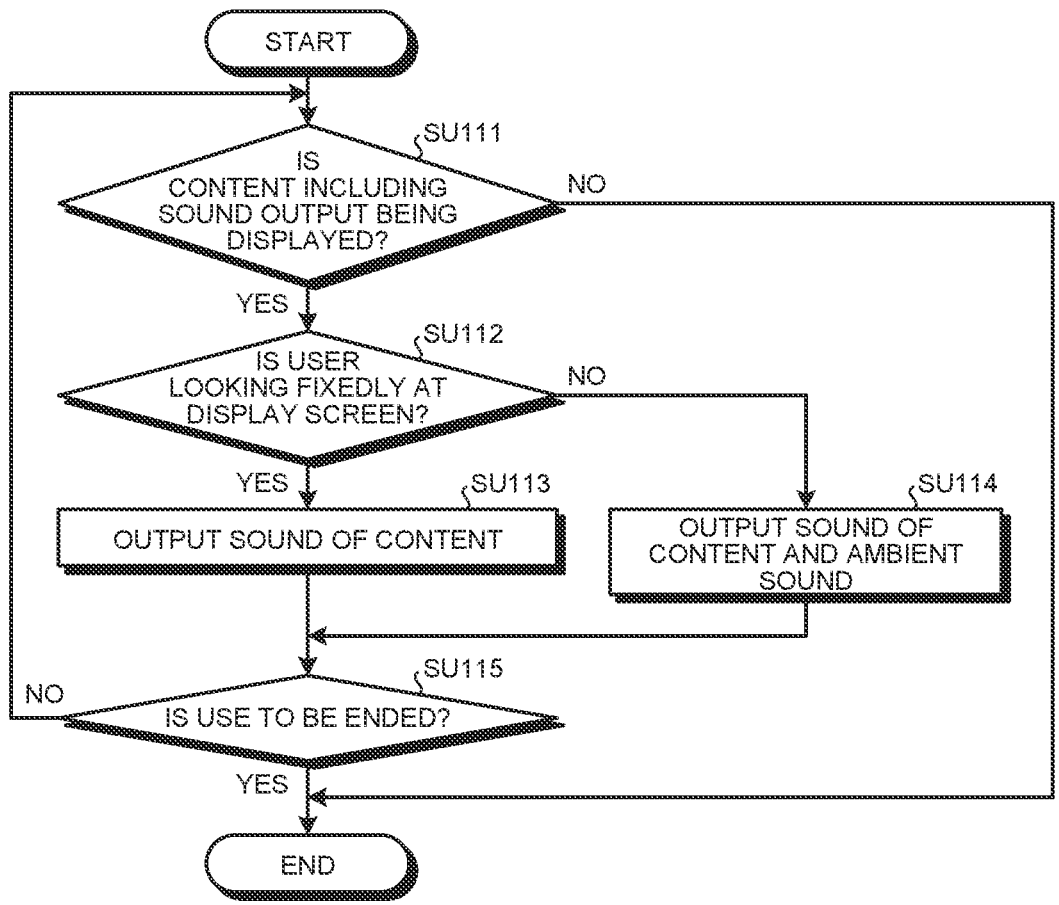
FIG. 19 is a flowchart illustrating another example of the flow of the processing in the content output system according to the seventh embodiment.

Information processing at the headphones 10U will be described next by use of FIG. 18 and FIG. 19. FIG. 18 is a flowchart illustrating an example of a flow of processing in the content output system 1U according to the seventh embodiment. FIG. 19 is a flowchart illustrating another example of the flow of the processing in the content output system 1U according to the seventh embodiment. For example, in a case where the power of the headphones 10U has been turned on, in a case where the headphones 10U have been worn over the head of the user, in a case where output of sound from the headphones 10U has been started, or in a case where start operation for content output control processing has been performed, the processing according to the flowchart illustrated in FIG. 18 or FIG. 19 is executed. At Step SU101, Step SU102, and Step SU105 of the flowchart illustrated in FIG. 18, processing similar to that of Step ST101, Step ST102, and Step ST105 of the flowchart illustrated in FIG. 11 is performed.

In a case where it is determined that the user is looking fixedly at the display screen (Yes at Step SU102), the content output control device 40U causes sound of content, to be output (Step SU103). More particularly, the sound output control unit 53U causes the sound obtained by the sound obtaining unit 51 and related to the content, to be output from the headphones 10U. The sound of the content is thereby output from a left sound output unit 11 and a right sound output unit 12 of the headphones 10U. The content output control device 40U then proceeds to Step ST105.

At Step SU103: in a case where ambient sound was not being output at the time of the determination, "Yes", at Step SU101, the output of the sound of the content is continued without output of ambient sound; and in a case where ambient sound was being output at the time of the determination, "Yes", at Step SU101, the output of the sound of the content is continued and the output of ambient sound is stopped.

In a case where it is determined that the user is not looking fixedly at the display screen 36 (No at Step SU102), the content output control device 40U outputs ambient sound (Step SU104). More particularly, the sound output control unit 53U outputs ambient sound obtained by the ambient sound obtaining unit 52. The ambient sound is thereby output from the left sound output unit 11 and the right sound output unit 12 of the headphones 10U. The content output control device 40U then proceeds to Step ST105.

At Step SU104, in a case where ambient sound was not being output at the time of the determination, "Yes", at Step SU101, output of ambient sound is started, and in a case where ambient sound was being output at the time of the determination, "Yes", at Step SU101, the output of ambient sound is maintained.

The processing illustrated in FIG. 19 will be described next. At Step SU111, Step SU112, Step SU113, and Step SU115 of the flowchart illustrated in FIG. 19, processing similar to that of Step SU101, Step SU102, Step SU103, and Step SU105 of the flowchart illustrated in FIG. 18 is performed.

In a case where it is determined that the user is not looking fixedly at the display screen 36 (No at Step SU112), the content output control device 40U outputs ambient sound, together with sound related to the content (Step SU114). More particularly, ambient sound obtained by the ambient sound obtaining unit 52 is output from the left sound output unit 11 and the right sound output unit 12 of the headphones 10U, together with the sound obtained by the sound obtaining unit 51 and related to the content. The content output control device 40U then proceeds to Step SU115.

At Step SU113: in a case where ambient sound was not being output at the time of the determination, "Yes", at Step SU111, the output of the sound of the content is continued without output of ambient sound; and in a case where ambient sound was being output at the time of the determination, "Yes", at Step SU111, the output of the sound of the content is continued and the output of ambient sound is stopped.

At Step SU114: in a case where the sound of the content was being output and ambient sound was not being output at the time of the determination, "Yes", at Step SU111, output of ambient sound is started with the output of the sound of the content maintained; and in a case where the sound of the content and ambient sound were both being output at the time of the determination, "Yes", at Step SU111, the output of both the sound of the content and ambient sound is maintained.

In a case where ambient sound is output together with the sound of content at Step SU114, the volume of the sound of the content may be a volume set by the user or may be made smaller than the volume set by the user while the ambient sound is being output.

As described above, in a case where the user wearing the headphones 10U is looking fixedly at the display screen 36, sound related to the content is output, and in a case where the user is not looking fixedly at the display screen 36, ambient sound is output.

Effects

As described above, in this seventh embodiment, in a case where the user wearing the headphones 10U is looking fixedly at the display screen 36, sound related to the content is output, and in a case where the user is not looking fixedly at the display screen 36, ambient sound is able to be output. According to this seventh embodiment, in a case where the user is presumed to have stopped looking fixedly at the display screen 36 and directed the user's attention to the surrounds, the user is able to hear ambient sound adequately. Accordingly, the seventh embodiment enables the user to hear ambient sound adequately even if the user does not perform any operation when the user desires to hear the ambient sound.

The seventh embodiment enables output of ambient sound, together with sound of the content, in a case where the user is not looking fixedly at the display screen 36. The seventh embodiment enables the user to hear the ambient sound while the user continues to view the content.

Eighth Embodiment

Figure 20:
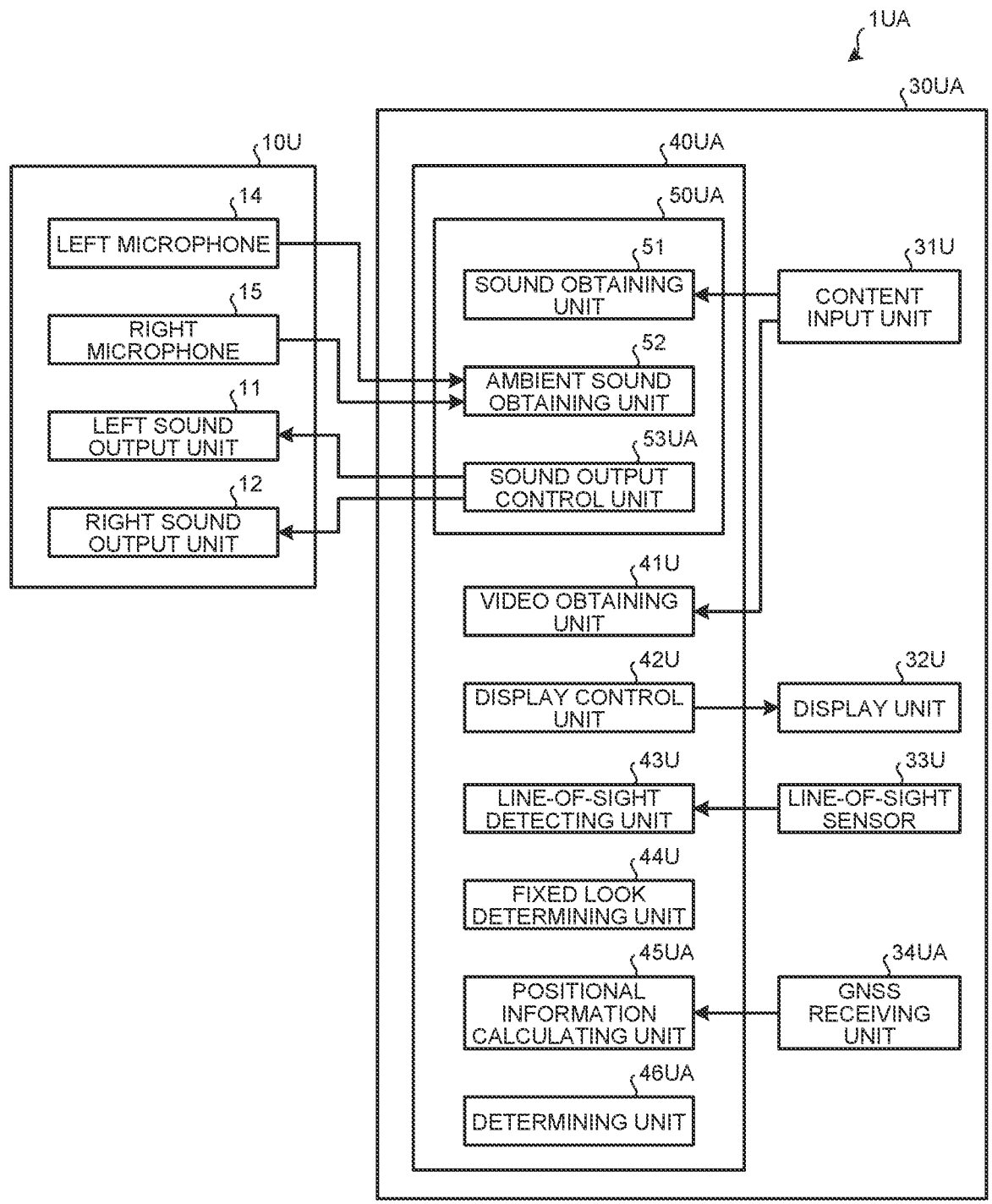
FIG. 20 is a block diagram of a content output system according to an eighth embodiment.
Figure 21:
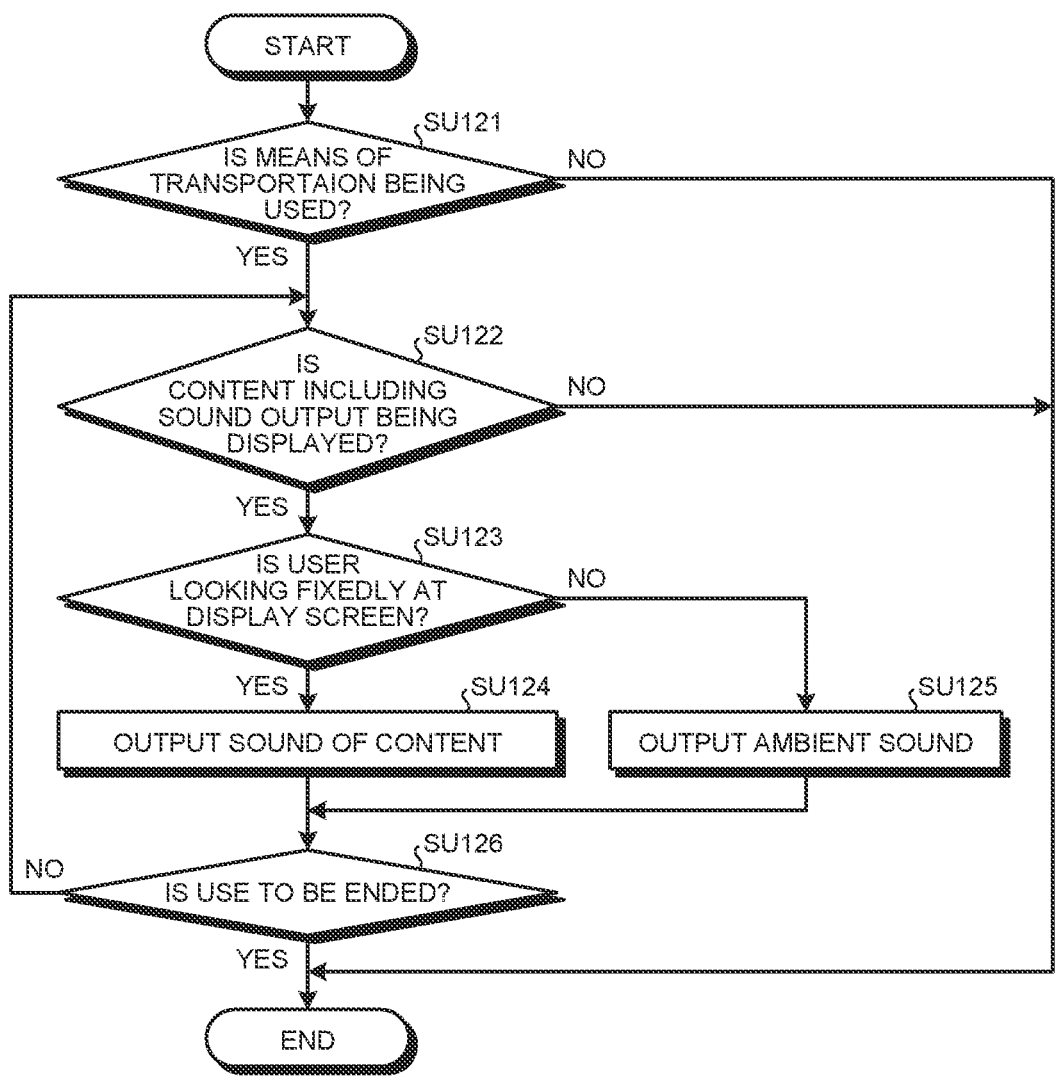
FIG. 21 is a flowchart illustrating an example of a flow of processing in the content output system according to the eighth embodiment.

A content output system 1UA according to an eighth embodiment will be described while reference is made to FIG. 20 and FIG. 21. FIG. 20 is a block diagram of the content output system 1UA according to the eighth embodiment. FIG. 21 is a flowchart illustrating an example of a flow of processing in the content output system 1UA according to the eighth embodiment. The basic configuration of the content output system 1UA is similar to that of the content output system 1U according to the seventh embodiment. In the following description, any component that is similar to that of the content output system 1U will be assigned with the same reference sign or a corresponding reference sign, and detailed description thereof will be omitted. An electronic device 30UA according to this eighth embodiment is different from that of the seventh embodiment in that the electronic device 30UA includes a GNSS receiving unit 34UA, and a positional information calculating unit 45UA and a determining unit 46UA that are both in a content output control device 40UA, and in processing at a sound output control unit 53UA.

The GNSS receiving unit 34US is configured similarly to the GNSS receiving unit 32B according to the third embodiment.

The positional information calculating unit 45UA is configured similarly to the positional information calculating unit 47B according to the third embodiment.

A determining unit 46UA is configured similarly to the determining unit 48B according to the third embodiment.

When a user is using a means of transportation: in a case where it is determined that the user is looking fixedly at a display screen 36 displaying content, the sound output control unit 53UA causes sound obtained by a sound obtaining unit 51 and related to the content, to be output; and in a case where it is determined that the user is not looking fixedly at the display screen 36 displaying the content, the sound output control unit 53UA causes ambient sound obtained by an ambient sound obtaining unit 52, to be output.

Information processing in the content output system 1UA will be described next by use of FIG. 21. At Step SU121 and Step SU126 of the flowchart illustrated in FIG. 21, processing similar to that of Step S121 and Step S125 of the flowchart illustrated in FIG. 9 is performed. At Step SU122 to Step SU125 of the flowchart illustrated in FIG. 21, processing similar to that of Step SU101 to Step SU104 of the flowchart illustrated in FIG. 18 is performed.

Effects

As described above, in this eighth embodiment, in a case where the user wearing headphones 10U is using a means of transportation and is not looking fixedly at the display screen 36, ambient sound is output. The eighth embodiment enables the ambient sound, such as an announcement, to be heard through the headphones 10U in a case where the user wearing the headphones 10U stops looking fixedly at the display screen 36 for content in order to listen to the announcement while the user is using the means of transportation, for example. This eighth embodiment prevents ambient sound from being needlessly output.

Ninth Embodiment

Figure 22:
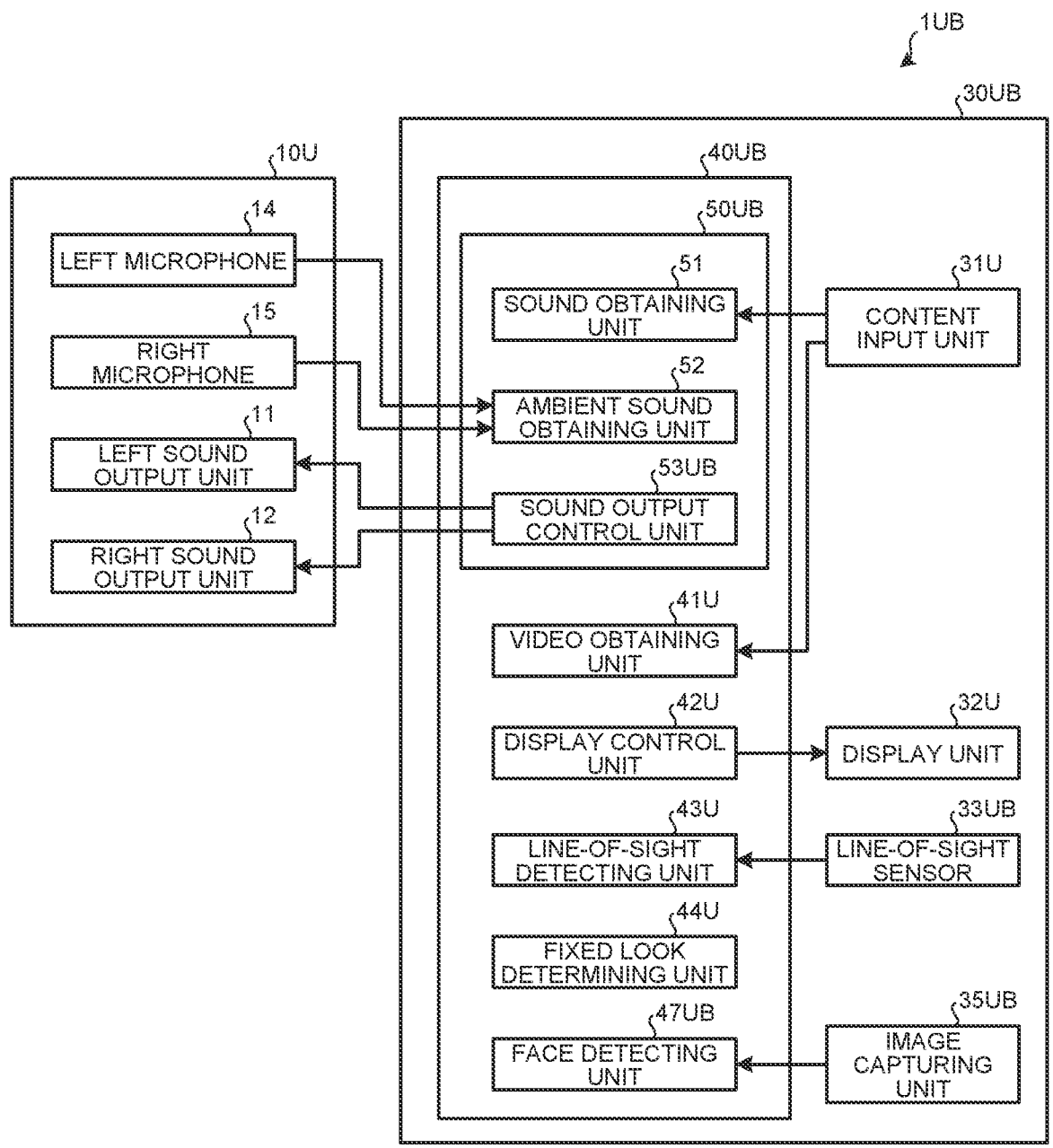
FIG. 22 is a block diagram of a content output system according to a ninth embodiment.

A content output system 1UB according to a ninth embodiment will be described while reference is made to FIG. 22 and FIG. 23. FIG. 22 is a block diagram of the content output system 1UB according to the ninth embodiment. FIG. 23 is a flowchart illustrating an example of a flow of processing in the content output system 1UB according to the ninth embodiment. The basic configuration of the content output system 1UB is similar to that of the content output system 1U according to the seventh embodiment. An electronic device 30UB according to this ninth embodiment is different from that of the seventh embodiment in that the electronic device 30UB includes an image capturing unit 35UB, and a face detecting unit 47UB in a content output control device 40UB and in processing at a sound output control unit 53UB.

The image capturing unit 35UB is configured similarly to the image capturing unit 33TA according to the fifth embodiment.

The face detecting unit 47UB is configured similarly to the face detecting unit 48TA according to the fifth embodiment.

In a case where a fixed look determining unit 44U determines that a user is looking fixedly at a display screen 36 displaying content and the face detected by the face detecting unit 47UB is orientated to face the display screen 36, the sound output control unit 53UB causes sound obtained by a sound obtaining unit 51 and related to the content, to be output. In a case where the fixed look determining unit 44U determines that the user is not looking fixedly at the display screen 36 displaying the content and the face detected by the face detecting unit 47UB is not orientated to face the display screen 36, the sound output control unit 53UB causes ambient sound obtained by an ambient sound obtaining unit 52, to be output. Even in a case where the user is not looking fixedly at the display screen 36 displaying the content, if the face of the user is facing the display screen 36, it is presumed that the user intends to continue viewing the content. In this case, the user is preferably allowed to continue viewing the content. On the contrary, in a case where the user is not looking fixedly at the display screen 36 displaying the content and the face of the user is not facing the display screen 36, the user is presumed to be paying the user's attention more to the surrounds. In this case, ambient sound is preferably made audible to the user.

Information processing in the content output system 1UB will be described next by use of FIG. 23. At Step SU131, Step SU132, and Step SU134 to Step SU136 of the flowchart illustrated in FIG. 23, processing similar to that of Step SU101, Step SU102, and Step SU103 to Step SU105 of the flowchart illustrated in FIG. 18 is performed. At Step SU133 of the flowchart illustrated in FIG. 23, processing similar to that of Step ST123 of the flowchart illustrated in FIG. 14 is performed.

Effects

As described, in this ninth embodiment, in a case where the user is looking fixedly at the display screen 36 and the face of the user is facing the display screen 36, sound of the content is output, and in a case where the user is not looking fixedly at the display screen 36 and the face of the user is not orientated to face the display screen 36, ambient sound obtained by the ambient sound obtaining unit 52 is able to be output. This ninth embodiment enables ambient sound to be adequately heard by the user when the user has changed the orientation of the face to the orientation where the face does not face the display screen 36 and it is presumed that the user has directed the user's attention to the surrounds.

The components of the sound output systems described above are functionally and/or conceptually illustrated in the drawings, and are not necessarily configured physically as illustrated in the drawings. That is, the specific form of each device is not limited to the one illustrated in the drawings, and all or a part of each device may be functionally or physically separated or integrated in any units according to the processing load on the device and the use situation of the device.

The configurations of the sound output systems are each implemented as, for example, software, by a program loaded into a memory. According to the description of the embodiments, the functional blocks are implemented by cooperation of pieces of hardware or pieces of software. That is, these functional blocks may be implemented in any of various forms, by hardware only, software only, or a combination of hardware and software.

The above described components include those that are easily anticipated by persons skilled in the art, and those that are substantially the same. Furthermore, the above described configurations may be combined as appropriate. In addition, without departing from the gist of the present disclosure, various omissions, substitutions, and modifications of the configurations are possible.

According to the above description, examples of a state where ambient sound is audible include a state where no ambient sound reducing processing is performed, and a state where ambient sound is output without any ambient sound reduction processing. In another example of the state where ambient sound is audible, the level of reduction of ambient sound may be decreased, that is, the effect of the noise canceling function may be reduced. In yet another example, both reduction of the effect of the noise canceling function and output of ambient sound may be performed. The processing of decreasing the level of reduction of ambient sound includes combining a signal with sound data obtained by the sound input unit 13 and outputting the combination through the sound output control unit 26, the signal resulting from inversion of the phase of ambient sound obtained by the left microphone 14 and the right microphone 15 and reduction of the sound pressure level.

According to the above description, the processing of making ambient sound audible is performed for both the left sound output unit 11 and the right sound output unit 12, but this processing may be performed for any one of the left sound output unit 11 and the right sound output unit 12. For example, the processing of making ambient sound audible may be set to be performed for one of the left sound output unit 11 and the right sound output unit 12, the one being that used by the dominant one of the ears of the user.

The sound output device is not necessarily the headphones 10 that have been described above as an example. The sound output device may be, for example, earphones or a neckband speaker. The sound output device is also applicable to an electronic earplug device having only the noise canceling function and not including the sound input unit 13.

The computer program for performing the sound output control method described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

The present disclosure presents an effect of enabling ambient sound to be heard adequately.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sound output control device, comprising:
an orientation detecting unit configured to detect a state of orientation of a face of a user with a sensor included in headphones worn by the user;
an ambient sound obtaining unit configured to obtain ambient sound around the user from a microphone included in the headphones;
an ambient sound reducing processing unit configured to perform, based on the ambient sound obtained by the ambient sound obtaining unit, processing of reducing the ambient sound for sound output of the headphones;
a determining unit configured to determine whether the user is using a means of transportation; and
when the determining unit determines that the user is using the means of transportation, a sound output control unit configured to, when the state of the orientation of the face of the user detected by the orientation detecting unit is in a first state, cause sound to be output with the ambient sound reduced by the ambient sound reducing processing unit, and when the state of the orientation of the face of the user detected by the orientation detecting unit is in a second state changed from the first state, make audibility of the ambient sound higher than in a state where the ambient sound has been reduced by the ambient sound reducing processing unit.

2. The sound output control device according to claim 1, wherein
the first state is a state where the face of the user is directed downward, and
the second state is a state where the face of the user is not directed downward.

3. The sound output control device according to claim 1, wherein
the first state is a state where acceleration caused by change in orientation of the face of the user is lower than a threshold, and
the second state is a state where the acceleration caused by the change in the orientation of the face of the user is equal to or higher than the threshold.

4. A sound output control device, comprising:
a line-of-sight detecting unit configured to detect a direction of a line of sight of a user with a line-of-sight sensor arranged to be directed in a same direction as a display screen;
an ambient sound obtaining unit configured to obtain ambient sound around the user from a microphone included in headphones worn by the user;
a fixed look determining unit configured to determine, based on a result of detection by the line-of-sight detecting unit, whether the user is looking fixedly at the display screen displaying content;
a determining unit configured to determine whether the user is using a means of transportation; and
when the determining unit determines that the user is using the means of transportation, a sound output control unit configured to, when the fixed look determining unit determines that the user is not looking fixedly at the display screen displaying content, make audibility of the ambient sound higher than when the fixed look determining unit determines that the user is looking fixedly at the display screen displaying content.

5. The sound output control device according to claim 4, further comprising:
an ambient sound reducing processing unit configured to perform, based on the ambient sound obtained by the ambient sound obtaining unit, processing of reducing the ambient sound for sound output by a sound output unit configured to output the sound to the user, wherein
the sound output control unit is configured to, when the fixed look determining unit determines that the user is looking fixedly at the display screen displaying the content, cause the sound to be output with the ambient sound reduced by the ambient sound reducing processing unit, and when the fixed look determining unit determines that the user is not looking fixedly at the display screen displaying the content, make audibility of the ambient sound higher than in a state where the ambient sound has been reduced by the ambient sound reducing processing unit.

6. The sound output control device according to claim 5, wherein the sound output control unit is configured to, when the fixed look determining unit determines that the user is not looking fixedly at the display screen displaying the content, cause the ambient sound reducing processing unit to not perform the processing of reducing the ambient sound, to make the audibility of the ambient sound higher than in the state where the ambient sound has been reduced by the ambient sound reducing processing unit.

7. The sound output control device according to claim 5, wherein the sound output control unit is configured to, when the fixed look determining unit determines that the user is not looking fixedly at the display screen displaying the content, cause the ambient sound to be output subjected to the processing of reducing the ambient sound by the ambient sound reducing processing unit and obtained by the ambient sound obtaining unit, to make the audibility of the ambient sound higher than in the state where the ambient sound has been reduced by the ambient sound reducing processing unit.

8. The sound output control device according to claim 4, further comprising:
a sound obtaining unit configured to obtain sound related to the content, wherein
the sound output control unit is configured to cause, when the fixed look determining unit determines that the user is looking fixedly at the display screen displaying the content, the sound to be output obtained by the sound obtaining unit and related to the content, and cause, when the fixed look determining unit determines that the user is not looking fixedly at the display screen displaying the content, the ambient sound to be output obtained by the ambient sound obtaining unit.

9. The sound output control device according to claim 8, wherein the sound output control unit is configured to cause, when the fixed look determining unit determines that the user is not looking fixedly at the display screen displaying the content, the ambient sound to be output obtained by the ambient sound obtaining unit, in addition to the sound obtained by the sound obtaining unit and related to the content.

10. The sound output control device according to claim 4, further comprising:
a face detecting unit configured to recognize a face of the user to detect an orientation of the face recognized, wherein the sound output control unit is configured to, when the fixed look determining unit determines that the user is not looking fixedly at the display screen displaying the content and the face detected by the face detecting unit is not facing the display screen, make audibility of the ambient sound higher than when the fixed look determining unit determines that the user is looking fixedly at the display screen displaying the content and the face detected by the face detecting unit is facing the display screen.

11. A sound output system, comprising:
the sound output control device according to claim 1;
a sound pickup unit configured to pick up ambient sound; and
a sound output unit configured to output sound.

12. A sound output system, comprising:
the sound output control device according to claim 4;
a sound pickup unit configured to pick up ambient sound; and
a sound output unit configured to output sound.

13. A sound output control method executed by a sound output control device, the sound output control method comprising:
detecting a state of orientation of a face of a user with a sensor included in headphones worn by the user;
obtaining ambient sound around the user from a microphone included in the headphones;
determining whether the user is using a means of transportation; and
when the user is using the means of transportation, outputting, when the state of the orientation of the face of the user is in a first state, sound with ambient sound that has been reduced for sound output of the headphones based on the ambient sound obtained, and making, when the state of the orientation of the face of the user is in a second state changed from the first state, audibility of ambient sound higher than in a state where the ambient sound has been reduced.

14. A non-transitory computer-readable storage medium storing a computer program causing a computer to execute:
detecting a state of orientation of a face of a user with a sensor included in headphones worn by the user;
obtaining ambient sound around the user from a microphone included in the headphones;
determining whether the user is using a means of transportation; and
when the user is using the means of transportation, outputting, when the state of the orientation of the face of the user is in a first state, sound with ambient sound that has been reduced for sound output of the headphones based on the ambient sound obtained, and making, when the state of the orientation of the face of the user is in a second state changed from the first state, audibility of ambient sound higher than in a state where the ambient sound has been reduced.

15. A sound output control method, comprising:
detecting a direction of a line of sight of a user who is using headphones, with a line-of-sight sensor arranged to be directed in a same direction as a display screen;
obtaining ambient sound around the user from a microphone included in the headphones;
determining, based on a result of detection of the direction of the line of sight, whether the user is looking fixedly at a display screen displaying content;
determining whether the user is using a means of transportation; and
when the user is using the means of transportation, making, when the user is not looking fixedly at the display screen displaying content, audibility of the ambient sound higher than when the user is looking fixedly at the display screen displaying content.

16. A non-transitory computer-readable storage medium storing a computer program causing a computer to execute:
detecting a direction of a line of sight of a user who is using headphones, with a line-of-sight sensor arranged to be directed in a same direction as a display screen;
obtaining ambient sound around the user from a microphone included in the headphones;
determining, based on a result of detection of the direction of the line of sight, whether the user is looking fixedly at a display screen displaying content;
determining whether the user is using a means of transportation; and
when the user is using the means of transportation, making, when the user is not looking fixedly at the display screen displaying content, audibility of the ambient sound higher than when the user is looking fixedly at the display screen displaying content.

* * * * *